US012812627B2

(12) United States Patent
Liu

(10) Patent No.: US 12,812,627 B2
(45) Date of Patent: Nov. 24, 2026

(54) METHOD AND DEVICE IN NODES USED FOR WIRELESS COMMUNICATION

(71) Applicant: Zheng Liu, Shanghai (CN)

(72) Inventor: Zheng Liu, Shanghai (CN)

(73) Assignee: SHANGHAI CODUS TECHNOLOGY COMPANY LIMITED, Shanghai (CN)

( * ) Notice: Subject to any disclaimer, the term of this patent is extended or adjusted under 35 U.S.C. 154(b) by 575 days.

(21) Appl. No.: 17/882,624

(22) Filed: Aug. 8, 2022

(65) Prior Publication Data

US 2023/0059861 A1 Feb. 23, 2023

(30) Foreign Application Priority Data

Aug. 19, 2021 (CN) ......................... 202110954025.5

(51) Int. Cl.
*H04W 72/1268* (2023.01)
*H04L 5/00* (2006.01)

(52) U.S. Cl.
CPC ....... *H04W 72/1268* (2013.01); *H04L 5/0055* (2013.01)

(58) Field of Classification Search
CPC ... H04L 5/0055; H04L 1/1812; H04L 1/1896; H04L 1/1887; H04W 72/512; H04B 7/0417
See application file for complete search history.

(56) References Cited

U.S. PATENT DOCUMENTS

2019/0190655 A1* 6/2019 Pan ........................ H03M 13/13
2021/0266941 A1* 8/2021 Park ...................... H04L 1/1861
2022/0070900 A1* 3/2022 Yin ........................ H04L 1/0003
2022/0078768 A1* 3/2022 El Hamss ............. H04W 72/21
(Continued)

FOREIGN PATENT DOCUMENTS

CN 101572596 A 11/2009
CN 110856265 A 2/2020
CN 112152762 A 12/2020
(Continued)

OTHER PUBLICATIONS

3GPP tsg_ran\WG1_RL1 2016-04-27 3gpp,"R1-163947 Draft 36.212 eMTC CR capturing RAN1#84bis agreements".
(Continued)

*Primary Examiner* — Yee F Lam
(74) *Attorney, Agent, or Firm* — Abd Almonem Doolaanea

(57) ABSTRACT

The present application discloses a method and a device in a node for wireless communications. A node receives a first information block, the first information block being used to determine a first factor; and transmits a target PUCCH, the target PUCCH at least carrying a first bit sub-block; the target PUCCH carries a non-negative integer number of bit(s) belonging to a second bit sub-block; the number of bit(s) comprised in the first bit sub-block and the number of bit(s) associated with the second bit sub-block are used together to determine a first RB numerical value; a resource occupied by the target PUCCH belongs to a target resource, with a number of RBs comprised in the target resource in frequency domain being equal to a second RB numerical value. The present application improves the resource utilization ratio of HARQ multiplexing.

15 Claims, 5 Drawing Sheets

(56) References Cited

U.S. PATENT DOCUMENTS

2022/0132496 A1* 4/2022 Lu .......................... H04W 72/21

FOREIGN PATENT DOCUMENTS

| | | | | | |
|---|---|---|---|---|---|
| CN | 112911713 | A | | 6/2021 | |
| CN | 113141241 | A | | 7/2021 | |
| WO | 20200028868 | A1 | | 2/2020 | |
| WO | 20200134382 | A1 | | 7/2020 | |
| WO | WO-2020145357 | A1 | * | 7/2020 | ........... H04L 1/0003 |
| WO | WO-2021004316 | A1 | * | 1/2021 | ........... H04L 1/0003 |

OTHER PUBLICATIONS

3GPP tsg_ran\WG1_RL1 2018-04-06 3gpp,"R1-1803833_ Remaining issues on PUCCH with long duration".

3GPP tsg_ran\wgl_rl1 2018-11-03 3gpp, "Draft CR1_213_UCI multiplexing on PUCCH".

First Office Action for the Chinese application CN202110954025.5, dated on Jan. 21, 2026.

First search report for the Chinese application CN202110954025.5, dated on Jan. 20, 2026.

Supplementary search report for the Chinese application CN202110954025.5, dated on Jun. 18, 2026.

* cited by examiner

METHOD AND DEVICE IN NODES USED FOR WIRELESS COMMUNICATION

CROSS REFERENCE TO RELATED APPLICATIONS

This application claims the priority benefit of Chinese Patent Application No. 202110954025.5, filed on Aug. 19, 2021, the full disclosure of which is incorporated herein by reference.

BACKGROUND

Technical Field

The present application relates to transmission methods and devices in wireless communication systems, and in particular to a scheme and a device for transmission of information of various priority levels in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR. A decision was made at the 3GPP RAN #86 Plenary to start the Study Item (SI) and Work Item (WI) of NR Rel-17.

In NR technology, enhanced Mobile BroadBand (eMBB), Ultra-reliable and Low Latency Communications (URLLC) and massive Machine Type Communications (mMTC) are three major application scenarios.

SUMMARY

Transmissions of data or control information of high and low priority levels are present in URLLC communications. In NR Rel-16, when Uplink Control Information (UCI) with various priority levels collide with each other in time domain, UCI with lower priority will be abandoned to guarantee transmissions of high-priority UCI. In NR Rel-17, UCI with different priority levels are supported to be multiplexed onto a same PUCCH or a same PUSCH.

To address the issue of multiplexing of UCI associated with different priority levels, the present application provides a solution. It should be noted that the description above only took URLLC scenarios as a typical example or application scenario, but the present application also applies to other scenarios confronting similar problems, such as scenarios where multiple types of traffics coexist, or other scenarios of multiplexing of information with different priority levels, of multiplexing of traffics with different QoS demands, or for various applications such as V2X or eMBB multiplexing, where similar technical effects can be achieved. Additionally, the adoption of a unified solution for various scenarios, including but not limited to URLLC scenarios, contributes to the reduction of hardcore complexity and costs. If no conflict is incurred, embodiments in the first node in the present application and the characteristics of the embodiments are also applicable to a second node, and vice versa. Particularly, for interpretations of the terminology, nouns, functions and variables (unless otherwise specified) in the present application, refer to definitions given in TS36 series, TS38 series and TS37 series of 3GPP specifications.

The present application provides a method in a first node for wireless communications, comprising:

- receiving a first information block, the first information block being used to determine a first factor; and
- transmitting a target PUCCH, the target PUCCH at least carrying a first bit sub-block, the first bit sub-block comprising at least one bit;
- herein, the target PUCCH carries a non-negative integer number of bit(s) belonging to a second bit sub-block, the second bit sub-block comprising at least one bit, the first bit sub-block and the second bit sub-block being different; a sum of a number of bit(s) comprised in the first bit sub-block and a number of bit(s) associated with the second bit sub-block is greater than 2, where the number of the bit(s) comprised in the first bit sub-block and the number of the bit(s) associated with the second bit sub-block are used together to determine a first RB numerical value; a resource occupied by the target PUCCH belongs to a target resource, with a number of RBs comprised in the target resource in frequency domain being equal to a second RB numerical value; a relative magnitude of the first RB numerical value and the second RB numerical value is used together with the first factor to determine a number of bit(s) carried by the target PUCCH that belongs (belong) to the second bit sub-block.

In one embodiment, a relative magnitude of a first RB numerical value and a second RB numerical value is used together with a first factor to determine a number of bit(s) comprised in a second bit sub-block carried by a target PUCCH, so that a number of lower-priority HARQ-ACK bit(s) being carried can be supported to be determined according to a maximum coding rate or scaling factor of the lower-priority HARQ-ACK bit(s), conditioned on the satisfaction of the transmission performance of higher-priority HARQ-ACK, as many as lower-priority HARQ-ACK bits can be carried for avoidance of unneeded abandonment of lower-priority HARQ-ACK bits, thereby enhancing the PUCCH resource utilization ratio and the HARQ-ACK performance.

According to one aspect of the present application, the above method is characterized in that a coding rate corresponding to the first bit sub-block and the number of the bit(s) comprised in the first bit sub-block are used together to determine a third RB numerical value; when the first RB numerical value is no greater than the second RB numerical value, the target PUCCH carries all bit(s) belonging to the second bit sub-block; when the first RB numerical value is greater than the second RB numerical value, a difference between the second RB numerical value and the third RB numerical value is used together with the first factor to determine the number of the bit(s) carried by the target PUCCH that belongs (belong) to the second bit sub-block.

In one embodiment, a same maximum coding rate (for instance, a maximum coding rate with high priority) is used for both high and low priority HARQ-ACK bits for determining a number of PRBs in a PUCCH, when the determined number of PRBs is larger than the configured number of PRBs, a coding rate or a scaling factor of lower-priority HARQ-ACK bits shall be taken into consideration for a final determination of whether and how many lower-priority HARQ-ACK bits are to be carried, thus enhancing the high- and low-priority reuse efficiency.

According to one aspect of the present application, the above method is characterized in comprising:

receiving a first signaling;

herein, the first signaling is used to determine the target resource from a target resource set, the target resource set comprising at least one PUCCH resource, at least the first two of the number of the bit(s) comprised in the first bit sub-block, the number of the bit(s) associated with the second bit sub-block and the first factor being used to determine the target resource set.

According to one aspect of the present application, the above method is characterized in that a first HARQ bit block is used for generating the second bit sub-block, the first HARQ bit block comprising at least one HARQ-ACK bit, a first bit numerical value is equal to a number of bit(s) comprised in the first HARQ bit block; a second bit numerical value is equal to a number of bit(s) comprised in the second bit sub-block, and the second bit numerical value is equal to one of X1 candidate numerical values, among the X1 candidate numerical values any candidate numerical value is a non-negative integer, where X1 is a positive integer greater than 1; the first bit numerical value is used to determine the second bit numerical value out of the X1 candidate numerical values.

In one embodiment, by rounding the number of low-priority HARQ-ACK bits to a reference number which is predefined or configured, the issue of ambiguity in the number of low-priority HARQ-ACK bits and the selection of resources that result from missed detection of DCI corresponding to low-priority HARQ-ACK can be avoided, thus effectively protecting the robustness of high-priority HARQ-ACK bits.

According to one aspect of the present application, the above method is characterized in that when the first bit numerical value is greater than the second bit numerical value, the second bit sub-block is generated by the first HARQ bit block through compression; when the first bit numerical value is smaller than the second bit numerical value, the second bit sub-block is generated by the first HARQ bit block through extension.

According to one aspect of the present application, the above method is characterized in that a value of a priority index associated with the first bit sub-block is equal to a first-priority index value, the first-priority index value being a non-negative integer; a value of a priority index associated with the second bit sub-block is equal to a second-priority index value, the second-priority index value being a non-negative integer; the first-priority index value and the second-priority index value are unequal; a value of a priority index associated with the target resource is equal to a larger one of the first-priority index value and the second-priority index value.

In one embodiment, PUCCH resources configured for high-priority HARQ-ACK are used to transmit a PUCCH multiplexed with high- and low-priority HARQ-ACK bits, further guaranteeing the transmission performance of higher-priority HARQ-ACK.

According to one aspect of the present application, the above method is characterized in that the number of the bit(s) comprised in the first bit sub-block and the number of the bit(s) associated with the second bit sub-block are used together to determine a first sum value; a first coding rate is equal to a coding rate corresponding to the first bit sub-block, a first modulation order is equal to a modulation order of the target PUCCH, a first resource numerical value is equal to a number of resource elements comprised in one RB used for control information bits; a product of the first RB numerical value, the first coding rate, the first modulation order and the first resource numerical value is no smaller than the first sum value, while a product of the first RB numerical value subtracted by 1, the first coding rate, the first modulation order and the first resource numerical value is smaller than the first sum value.

The present application provides a method in a second node for wireless communications, comprising:

transmitting a first information block, the first information block being used to indicate a first factor; and receiving a target PUCCH, the target PUCCH at least carrying a first bit sub-block, the first bit sub-block comprising at least one bit;

herein, the target PUCCH carries a non-negative integer number of bit(s) belonging to a second bit sub-block, the second bit sub-block comprising at least one bit, the first bit sub-block and the second bit sub-block being different; a sum of a number of bit(s) comprised in the first bit sub-block and a number of bit(s) associated with the second bit sub-block is greater than 2, where the number of the bit(s) comprised in the first bit sub-block and the number of the bit(s) associated with the second bit sub-block are used together to determine a first RB numerical value; a resource occupied by the target PUCCH belongs to a target resource, with a number of RBs comprised in the target resource in frequency domain being equal to a second RB numerical value; a relative magnitude of the first RB numerical value and the second RB numerical value is used together with the first factor to determine a number of bit(s) carried by the target PUCCH that belongs (belong) to the second bit sub-block.

According to one aspect of the present application, the above method is characterized in that a coding rate corresponding to the first bit sub-block and the number of the bit(s) comprised in the first bit sub-block are used together to determine a third RB numerical value; when the first RB numerical value is no greater than the second RB numerical value, the target PUCCH carries all bit(s) belonging to the second bit sub-block; when the first RB numerical value is greater than the second RB numerical value, a difference between the second RB numerical value and the third RB numerical value is used together with the first factor to determine the number of the bit(s) carried by the target PUCCH that belongs (belong) to the second bit sub-block.

According to one aspect of the present application, the above method is characterized in comprising:

transmitting a first signaling;

herein, the first signaling is used to determine the target resource from a target resource set, the target resource set comprising at least one PUCCH resource, at least the first two of the number of the bit(s) comprised in the first bit sub-block, the number of the bit(s) associated with the second bit sub-block and the first factor being used to determine the target resource set.

According to one aspect of the present application, the above method is characterized in that a first HARQ bit block is used for generating the second bit sub-block, the first HARQ bit block comprising at least one HARQ-ACK bit, a first bit numerical value is equal to a number of bit(s) comprised in the first HARQ bit block; a second bit numerical value is equal to a number of bit(s) comprised in the second bit sub-block, and the second bit numerical value is equal to one of X1 candidate numerical values, among the X1 candidate numerical values any candidate numerical value is a non-negative integer, where X1 is a positive integer greater than 1; the first bit numerical value is used to determine the second bit numerical value out of the X1 candidate numerical values.

According to one aspect of the present application, the above method is characterized in that when the first bit numerical value is greater than the second bit numerical value, the second bit sub-block is generated by the first HARQ bit block through compression; when the first bit numerical value is smaller than the second bit numerical value, the second bit sub-block is generated by the first HARQ bit block through extension.

According to one aspect of the present application, the above method is characterized in that a value of a priority index associated with the first bit sub-block is equal to a first-priority index value, the first-priority index value being a non-negative integer; a value of a priority index associated with the second bit sub-block is equal to a second-priority index value, the second-priority index value being a non-negative integer; the first-priority index value and the second-priority index value are unequal; a value of a priority index associated with the target resource is equal to a larger one of the first-priority index value and the second-priority index value.

According to one aspect of the present application, the above method is characterized in that the number of the bit(s) comprised in the first bit sub-block and the number of the bit(s) associated with the second bit sub-block are used together to determine a first sum value; a first coding rate is equal to a coding rate corresponding to the first bit sub-block, a first modulation order is equal to a modulation order of the target PUCCH, a first resource numerical value is equal to a number of resource elements comprised in one RB used for control information bits; a product of the first RB numerical value, the first coding rate, the first modulation order and the first resource numerical value is no smaller than the first sum value, while a product of the first RB numerical value subtracted by 1, the first coding rate, the first modulation order and the first resource numerical value is smaller than the first sum value.

The present application provides a first node for wireless communications, comprising:

a first receiver, which receives a first information block, the first information block being used to determine a first factor; and a first transmitter, which transmits a target PUCCH, the target PUCCH at least carrying a first bit sub-block, the first bit sub-block comprising at least one bit;

herein, the target PUCCH carries a non-negative integer number of bit(s) belonging to a second bit sub-block, the second bit sub-block comprising at least one bit, the first bit sub-block and the second bit sub-block being different; a sum of a number of bit(s) comprised in the first bit sub-block and a number of bit(s) associated with the second bit sub-block is greater than 2, where the number of the bit(s) comprised in the first bit sub-block and the number of the bit(s) associated with the second bit sub-block are used together to determine a first RB numerical value; a resource occupied by the target PUCCH belongs to a target resource, with a number of RBs comprised in the target resource in frequency domain being equal to a second RB numerical value; a relative magnitude of the first RB numerical value and the second RB numerical value is used together with the first factor to determine a number of bit(s) carried by the target PUCCH that belongs (belong) to the second bit sub-block.

The present application provides a second node for wireless communications, comprising:

a second transmitter, which transmits a first information block, the first information block being used to indicate a first factor; and a second receiver, which receives a target PUCCH, the target PUCCH at least carrying a first bit sub-block, the first bit sub-block comprising at least one bit;

herein, the target PUCCH carries a non-negative integer number of bit(s) belonging to a second bit sub-block, the second bit sub-block comprising at least one bit, the first bit sub-block and the second bit sub-block being different; a sum of a number of bit(s) comprised in the first bit sub-block and a number of bit(s) associated with the second bit sub-block is greater than 2, where the number of the bit(s) comprised in the first bit sub-block and the number of the bit(s) associated with the second bit sub-block are used together to determine a first RB numerical value; a resource occupied by the target PUCCH belongs to a target resource, with a number of RBs comprised in the target resource in frequency domain being equal to a second RB numerical value; a relative magnitude of the first RB numerical value and the second RB numerical value is used together with the first factor to determine a number of bit(s) carried by the target PUCCH that belongs (belong) to the second bit sub-block.

In one embodiment, the method in the present application has the following advantages:

- the method in the present application supports determining a number of lower-priority HARQ-ACK bit(s) being carried according to a maximum coding rate or scaling factor of the low-priority HARQ-ACK bit(s), conditioned on the satisfaction of the transmission performance of higher-priority HARQ-ACK, as many as lower-priority HARQ-ACK bits can be carried for avoidance of unneeded abandonment of lower-priority HARQ-ACK bits, thereby enhancing the PUCCH resource utilization ratio and the HARQ-ACK performance.
- the method in the present application uses a same maximum coding rate (for instance, a maximum coding rate with high priority) for both high and low priority HARQ-ACK bits for determining a number of PRBs in a PUCCH, when the determined number of PRBs is larger than the configured number of PRBs, a coding rate or a scaling factor of lower-priority HARQ-ACK bits shall be taken into consideration for a final determination of whether and how many lower-priority HARQ-ACK bits are to be carried, thus enhancing the high- and low-priority reuse efficiency.
- with the method in the present application, by rounding the number of low-priority HARQ-ACK bits to a reference number which is predefined or configured, the issue of ambiguity in the number of low-priority HARQ-ACK bits and the selection of resources that result from missed detection of DCI corresponding to low-priority HARQ-ACK can be avoided, thus effectively protecting the robustness of high-priority HARQ-ACK bits.
- the method in the present application uses PUCCH resources configured for high-priority HARQ-ACK to transmit a PUCCH multiplexed with high- and low-priority HARQ-ACK bits, further guaranteeing the transmission performance of higher-priority HARQ-ACK.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
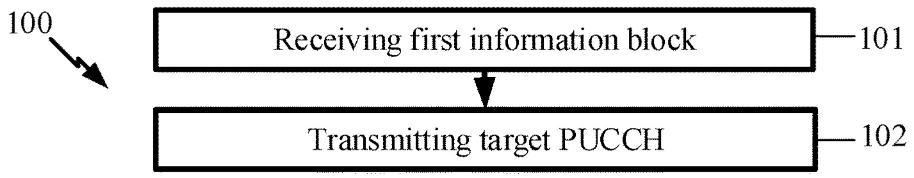
FIG. 1 illustrates a flowchart of a first information block and a target PUCCH according to one embodiment of the present application.

Embodiment 1 illustrates a flowchart 100 of a first information block and a target PUCCH according to one embodiment of the present application, as shown in FIG. 1. In FIG. 1, each step represents a step, it should be particularly noted that the sequence order of each box herein only indicates the order between the two consecutive steps taken respectively, rather than imply a chronological order of steps marked respectively by these boxes.

In Embodiment 1, the first node in the present application receives a first information block in step 101, the first information block being used to determine a first factor; and transmits a target PUCCH in step 102, the target PUCCH at least carrying a first bit sub-block, the first bit sub-block comprising at least one bit; herein, the target PUCCH carries a non-negative integer number of bit(s) belonging to a second bit sub-block, the second bit sub-block comprising at least one bit, the first bit sub-block and the second bit sub-block being different; a sum of a number of bit(s) comprised in the first bit sub-block and a number of bit(s) associated with the second bit sub-block is greater than 2, where the number of the bit(s) comprised in the first bit sub-block and the number of the bit(s) associated with the second bit sub-block are used together to determine a first RB numerical value; a resource occupied by the target PUCCH belongs to a target resource, with a number of RBs comprised in the target resource in frequency domain being equal to a second RB numerical value; a relative magnitude of the first RB numerical value and the second RB numerical value is used together with the first factor to determine a number of bit(s) carried by the target PUCCH that belongs (belong) to the second bit sub-block.

In one embodiment, the first information block is transmitted via an air interface or a radio interface.

In one embodiment, the first information block comprises all or part of a Higher Layer signaling or a physical layer signaling.

In one embodiment, the first information block comprises all or part of a Radio Resource Control (RRC) layer signaling or a Medium Access Control (MAC) layer signaling.

In one embodiment, the first information block is carried by a Physical Downlink Shared Channel (PDSCH).

In one embodiment, the first information block is Cell Specific or UE-Specific.

In one embodiment, the first information block is Per BWP Configured, where BWP refers to Bandwidth Part.

In one embodiment, the first information block comprises all or partial fields in a Downlink Control Information (DCI) Format.

In one embodiment, the first information block comprises multiple sub-information-blocks, each sub-information-block comprised in the first information block being an Information Element (IE) or a field in an RRC signaling to which the first information block belongs; one or more sub-information-blocks comprised in the first information block is(are) used to determine the first factor.

In one embodiment, the first information block comprises all or partial fields in an Information Element (IE) "PUCCH-Config".

In one embodiment, the first information block comprises all or partial fields in an Information Element (IE) "BWP-UplinkDedicated".

In one embodiment, the first information block comprises all or partial fields in an Information Element (IE) "PUCCH-ConfigurationList".

In one embodiment, the first information block comprises all or partial fields in a first "PUCCH-Config" IE comprised in an Information Element (IE) "PUCCH-Configuration-List".

In one embodiment, the first information block comprises all or partial fields in a second "PUCCH-Config" IE comprised in an Information Element (IE) "PUCCH-ConfigurationList".

In one embodiment, the first information block comprises a "maxCodeRate" field in a "PUCCH-FormatConfig" Field in an Information Element (IE) "PUCCH-Config".

In one embodiment, the first information block comprises a "maxCodeRate-r17" field in a "PUCCH-FormatConfig" Field in an Information Element (IE) "PUCCH-Config".

In one embodiment, the statement in the claims that "the first information block being used to determine a first factor"

comprises the meaning that the first information block is used by the first node in the present application to determine the first factor.

In one embodiment, the statement in the claims that "the first information block being used to determine a first factor" comprises the meaning that the first information block is used for explicitly or implicitly indicating the first factor.

In one embodiment, the statement in the claims that "the first information block being used to determine a first factor" comprises the meaning that the first information block explicitly or implicitly indicates a second coding rate, the second coding rate being used for calculating the first factor.

In one embodiment, the statement in the claims that "the first information block being used to determine a first factor" comprises the meaning that the first information block explicitly or implicitly indicates a second coding rate, where the first factor is equal to a ratio of the first coding rate in the present application to the second coding rate.

In one embodiment, the statement in the claims that "the first information block being used to determine a first factor" comprises the meaning that the first information block explicitly or implicitly indicates a second coding rate, where the first factor is equal to a ratio of the second coding rate to the first coding rate in the present application.

In one embodiment, the statement in the claims that "the first information block being used to determine a first factor" comprises the meaning that the first information block explicitly or implicitly indicates a second coding rate, where a ratio of the first coding rate in the present application to the second coding rate is used to determine the first factor.

In one embodiment, the statement in the claims that "the first information block being used to determine a first factor" comprises the meaning that the first information block explicitly or implicitly indicates a second coding rate, where a ratio of the second coding rate to the first coding rate in the present application is used to determine the first factor.

In one embodiment, the first factor is equal to a configured maximum coding rate.

In one embodiment, the first factor is equal to a configured maximum coding rate with a corresponding priority index value being equal to "0".

In one embodiment, the first factor is equal to a value configured by a "maxCodeRate" field in a second "PUCCH-Config" IE comprised in an Information Element (IE) "PUCCH-ConfigurationList".

In one embodiment, the first factor is equal to a maximum coding rate configured by a field other than a "maxCodeRate" field in a second "PUCCH-Config" IE comprised in an Information Element (IE) "PUCCH-ConfigurationList".

In one embodiment, the first factor is equal to a value configured by a "maxCodeRate-r17" field in a second "PUCCH-Config" IE comprised in an Information Element (IE) "PUCCH-ConfigurationList".

In one embodiment, the first factor is equal to a value configured by a "maxCodeRate" field.

In one embodiment, the first factor is equal to a value of a maximum coding rate configured by a "UCCH-Format-Config" field in a second "PUCCH-Config" IE comprised in an Information Element (IE) "PUCCH-ConfigurationList".

In one embodiment, the first factor is equal to a value of a maximum coding rate configured by a "UCCH-Format-Config" field in a first "PUCCH-Config" IE comprised in an Information Element (IE) "PUCCH-ConfigurationList".

In one embodiment, the first factor is equal to a ratio between two configured maximum coding rates.

In one embodiment, a ratio between two configured maximum coding rates is used to determine the first factor.

In one embodiment, the first factor is equal to a ratio between two maximum coding rates configured by a same "PUCCH-Config" IE.

In one embodiment, a ratio between two maximum coding rates configured by a same "PUCCH-Config" IE is used to determine the first factor.

In one embodiment, the first factor is greater than or equal to 0.

In one embodiment, the first factor is less than or equal to 1.

In one embodiment, the first factor is less than 1.

In one embodiment, the first factor is greater than 1.

In one embodiment, the first factor is equal to a ratio of a maximum coding rate with a corresponding priority index value being equal to "1" to a maximum coding rate with a corresponding priority index value being equal to "0".

In one embodiment, the first factor is equal to a ratio of a maximum coding rate with a corresponding priority index value being equal to "0" to a maximum coding rate with a corresponding priority index value being equal to "1".

In one embodiment, the first factor is equal to a ratio of a maximum coding rate corresponding to a first-priority index value in the present application to a maximum coding rate corresponding to a second-priority index value in the present application.

In one embodiment, the first factor is equal to a ratio of a maximum coding rate corresponding to a second-priority index value in the present application to a maximum coding rate corresponding to a first-priority index value in the present application.

In one embodiment, the first factor is equal to a ratio of a value of a maximum coding rate configured by a "PUCCH-FormatConfig" field in a first "PUCCH-Config" IE comprised in an IE "PUCCH-ConfigurationList" to a value of a maximum coding rate configured by a "PUCCH-Format-Config" field in a second "PUCCH-Config" IE comprised in an IE "PUCCH-ConfigurationList".

In one embodiment, the first factor is equal to a ratio of a value of a maximum coding rate configured by a "PUCCH-FormatConfig" field in a second "PUCCH-Config" IE comprised in an IE "PUCCH-ConfigurationList" to a value of a maximum coding rate configured by a "PUCCH-Format-Config" field in a first "PUCCH-Config" IE comprised in an IE "PUCCH-ConfigurationList".

In one embodiment, the first factor is equal to a ratio between values of two maximum coding rates configured by a second "PUCCH-Config" IE comprised in an IE "PUCCH-ConfigurationList".

In one embodiment, the target PUCCH comprises a radio frequency signal of a Physical Uplink Control Channel (PUCCH) or a baseband signal of a PUCCH.

In one embodiment, the target PUCCH carries Uplink control information (UCI).

In one embodiment, UCI payload using a UCI Format is used for generating the target PUCCH.

In one embodiment, the target PUCCH uses a PUCCH Format 2.

In one embodiment, the target PUCCH uses a PUCCH Format 3 or 4.

In one embodiment, the target PUCCH only occupies one Physical Resource Block (PRB) in frequency domain in an OFDM symbol.

In one embodiment, the target PUCCH occupies multiple Physical Resource Blocks (PRBs) in frequency domain in an OFDM symbol.

In one embodiment, the first bit sub-block comprises information bits and a CRC bit.

In one embodiment, the first bit sub-block only comprises information bits.

In one embodiment, the first bit sub-block only comprises one bit.

In one embodiment, the first bit sub-block comprises more than one bit.

In one embodiment, the first bit sub-block comprises a bit other than a HARQ-ACK bit.

In one embodiment, any bit comprised in the first bit sub-block is a HARQ-ACK bit.

In one embodiment, the first bit sub-block only comprises a HARQ-ACK bit and a CRC bit.

In one embodiment, the first bit sub-block is UCI Payload.

In one embodiment, the first bit sub-block comprises a Channel Status Information (CSI) bit.

In one embodiment, any bit comprised in the first bit sub-block is a coded bit.

In one embodiment, any bit comprised in the first bit sub-block is an uncoded bit.

In one embodiment, the first bit sub-block is obtained by a HARQ-ACK bit through compression, bundling, dropping, padding, shortening or extension.

In one embodiment, the first bit sub-block is obtained by a HARQ-ACK codebook through compression, bundling, dropping, padding, shortening or extension.

In one embodiment, the first bit sub-block is obtained by a HARQ-ACK bit through transformation or processing.

In one embodiment, the first bit sub-block is obtained by a HARQ-ACK bit through transformation or processing, where any bit comprised in the first bit sub-block is a bit not through channel coding.

In one embodiment, the statement in the claims that "the target PUCCH at least carrying a first bit sub-block" means that the target PUCCH is at least used for transmission of the first bit sub-block.

In one embodiment, the statement in the claims that "the target PUCCH at least carrying a first bit sub-block" means that payload of the target PUCCH at least comprises a bit in the first bit sub-block.

In one embodiment, the statement in the claims that "the target PUCCH at least carrying a first bit sub-block" means that payload of a UCI format used by the target PUCCH at least comprises the first bit sub-block.

In one embodiment, the statement in the claims that "the target PUCCH at least carrying a first bit sub-block" means that at least the first bit sub-block is used for generating the target PUCCH.

In one embodiment, the statement in the claims that "the target PUCCH at least carrying a first bit sub-block" means that the first bit sub-block is transmitted in the target PUCCH.

In one embodiment, the statement in the claims that "the target PUCCH at least carrying a first bit sub-block" means that the target PUCCH can also carry a bit outside the first bit sub-block.

In one embodiment, the second bit sub-block comprises information bits and a CRC bit.

In one embodiment, the second bit sub-block only comprises information bits.

In one embodiment, the second bit sub-block only comprises one bit.

In one embodiment, the second bit sub-block comprises more than one bit.

In one embodiment, the second bit sub-block comprises a bit other than a HARQ-ACK bit.

In one embodiment, the second bit sub-block is UCI Payload.

In one embodiment, the second bit sub-block is a HARQ-ACK codebook.

In one embodiment, the second bit sub-block is a type-1 HARQ-ACK codebook.

In one embodiment, the second bit sub-block is a type-2 HARQ-ACK codebook.

In one embodiment, the second bit sub-block is a HARQ-ACK bit sub-block for reference.

In one embodiment, the second bit sub-block is a HARQ-ACK codebook for reference.

In one embodiment, the second bit sub-block comprises a padding bit and a HARQ bit.

In one embodiment, any bit comprised in the second bit sub-block is a HARQ-ACK bit.

In one embodiment, the second bit sub-block comprises a Channel Status Information (CSI) bit.

In one embodiment, any bit comprised in the second bit sub-block is a coded bit.

In one embodiment, any bit comprised in the second bit sub-block is an uncoded bit.

In one embodiment, any bit comprised in the second bit sub-block is a coded bit of a HARQ-ACK codebook.

In one embodiment, any bit comprised in the second bit sub-block is a coded bit of a HARQ-ACK bit.

In one embodiment, a value of a priority index associated with the first bit sub-block is equal to "1", and a value of a priority index associated with the second bit sub-block is equal to "0".

In one embodiment, a value of a priority index associated with the first bit sub-block is greater than a value of a priority index associated with the second bit sub-block.

In one embodiment, priority level of the first bit sub-block is higher than that of the second bit sub-block.

In one embodiment, the second bit sub-block is obtained by a HARQ-ACK bit through compression, bundling, dropping, padding, shortening or extension.

In one embodiment, the second bit sub-block is obtained by a HARQ-ACK codebook through compression, bundling, dropping, padding, shortening or extension.

In one embodiment, the second bit sub-block is obtained by a HARQ-ACK bit through transformation or processing.

In one embodiment, the second bit sub-block is obtained by a HARQ-ACK bit through transformation or processing, where any bit comprised in the second bit sub-block is a bit not through channel coding.

In one embodiment, a number of bit(s) belonging to the second bit sub-block carried by the target PUCCH is equal to 0.

In one embodiment, a number of bit(s) belonging to the second bit sub-block carried by the target PUCCH is greater than 0.

In one embodiment, the target PUCCH carries all or part of bits in the second bit sub-block.

In one embodiment, the target PUCCH does not carry any bit in the second bit sub-block.

In one embodiment, the statement in the claims that "the target PUCCH carries a non-negative integer number of bit(s) belonging to a second bit sub-block" means that the target PUCCH carries all or part of bit(s) in the second bit sub-block, or the target PUCCH does not carry any bit in the second bit sub-block.

In one embodiment, the statement in the claims that "the target PUCCH carries a non-negative integer number of bit(s) belonging to a second bit sub-block" means that the target PUCCH carries all or part of bit(s) in the second bit sub-block, or the target PUCCH does not carry any bit in the second bit sub-block; when the target PUCCH carries all or part of bit(s) in the second bit sub-block, payload of the target PUCCH comprises at least one bit in the second bit sub-block.

In one embodiment, the statement in the claims that "the target PUCCH carries a non-negative integer number of bit(s) belonging to a second bit sub-block" means that the target PUCCH carries all or part of bit(s) in the second bit sub-block, or the target PUCCH does not carry any bit in the second bit sub-block; when the target PUCCH carries all or part of bit(s) in the second bit sub-block, at least one bit in the second bit sub-block is used for generating the target PUCCH.

In one embodiment, the statement in the claims that "the target PUCCH carries a non-negative integer number of bit(s) belonging to a second bit sub-block" means that the target PUCCH carries all or part of bit(s) in the second bit sub-block, or the target PUCCH does not carry any bit in the second bit sub-block; when the target PUCCH carries all or part of bit(s) in the second bit sub-block, the second bit sub-block is transmitted in the target PUCCH.

In one embodiment, the statement in the claims that "the target PUCCH carries a non-negative integer number of bit(s) belonging to a second bit sub-block" means that the target PUCCH carries all or part of bit(s) in the second bit sub-block, or the target PUCCH does not carry any bit in the second bit sub-block; when the target PUCCH carries all or part of bit(s) in the second bit sub-block, any bit comprised in the second bit sub-block as a coded bit is transmitted in the target PUCCH.

In one embodiment, the statement in the claims that "the target PUCCH carries a non-negative integer number of bit(s) belonging to a second bit sub-block" means that the target PUCCH carries all or part of bit(s) in the second bit sub-block, or the target PUCCH does not carry any bit in the second bit sub-block; when the target PUCCH carries all or part of bit(s) in the second bit sub-block, any bit comprised in the second bit sub-block as a bit before coding is transmitted in the target PUCCH.

In one embodiment, the statement in the claims that "the first bit sub-block and the second bit sub-block being different" means that a type of the first bit sub-block is different from a type of the second bit sub-block.

In one embodiment, the statement in the claims that "the first bit sub-block and the second bit sub-block being different" means that the first bit sub-block and the second bit sub-block are independent from each other.

In one embodiment, the statement in the claims that "the first bit sub-block and the second bit sub-block being different" means that any bit comprised in the first bit sub-block is a HARQ-ACK bit, while any bit comprised in the second bit sub-block is a bit obtained by processing or transforming a HARQ-ACK bit.

In one embodiment, the statement in the claims that "the first bit sub-block and the second bit sub-block being different" means that the first bit sub-block and the second bit sub-block are respectively two independent HARQ-ACK codebooks.

In one embodiment, the statement in the claims that "the first bit sub-block and the second bit sub-block being different" means that the first bit sub-block and the second bit sub-block respectively go through two independent channel codings.

In one embodiment, bit(s) associated with the second bit sub-block is(are) bit(s) used for generating the second bit sub-block.

In one embodiment, bit(s) associated with the second bit sub-block is(are) HARQ-ACK bit(s) used for generating the second bit sub-block.

In one embodiment, any bit associated with the second bit sub-block is a bit comprised in a HARQ-ACK codebook used for generating the second bit sub-block.

In one embodiment, any bit associated with the second bit sub-block is a bit comprised in the second bit sub-block.

In one embodiment, a bit block consisting of bit(s) associated with the second bit sub-block is the second bit sub-block.

In one embodiment, "bit(s) associated with the second bit sub-block" and "bit(s) comprised in the second bit sub-block" can be interchanged.

In one embodiment, "bit(s) associated with the second bit sub-block" and "bit(s) generating the second bit sub-block" can be interchanged.

In one embodiment, "bit(s) associated with the second bit sub-block" and "bit(s) comprised in a HARQ-ACK codebook generating the second bit sub-block" can be interchanged.

In one embodiment, a number of bit(s) associated with the second bit sub-block is equal to a number of bit(s) comprised in the second bit sub-block.

In one embodiment, a number of bit(s) associated with the second bit sub-block is unequal to a number of bit(s) comprised in the second bit sub-block.

In one embodiment, a number of bit(s) associated with the second bit sub-block is greater than a number of bit(s) comprised in the second bit sub-block.

In one embodiment, a number of bit(s) associated with the second bit sub-block is less than a number of bit(s) comprised in the second bit sub-block.

In one embodiment, a number of bit(s) associated with the second bit sub-block and a number of bit(s) comprised in the second bit sub-block are equal.

In one embodiment, a number of bit(s) associated with the second bit sub-block and a number of bit(s) comprised in a HARQ-ACK codebook used for generating the second bit sub-block are equal.

In one embodiment, a number of bit(s) associated with the second bit sub-block refers to a number of bit(s) comprised in the second bit sub-block.

In one embodiment, a number of bit(s) associated with the second bit sub-block refers to a number of bit(s) comprised in a HARQ-ACK codebook used for generating the second bit sub-block.

In one embodiment, a number of bit(s) associated with the second bit sub-block and a number of bit(s) comprised in a reference HARQ-ACK codebook used for generating the second bit sub-block are equal.

In one embodiment, a number of bit(s) associated with the second bit sub-block refers to a number of bit(s) comprised in a reference HARQ-ACK codebook used for generating the second bit sub-block.

In one embodiment, a number of bit(s) associated with the second bit sub-block refers to a number of bit(s) comprised in a padding bit-including HARQ-ACK codebook used for generating the second bit sub-block.

In one embodiment, the first RB numerical value is a positive integer.

In one embodiment, the first RB numerical value is used for expressing a number of Physical Resource Blocks (PRBs).

In one embodiment, the first RB numerical value is used for expressing a number of Virtual Resource Blocks (VRBs).

In one embodiment, the first RB numerical value is used for expressing a number of PRBs in a time-domain symbol.

In one embodiment, the statement in the claims that "the number of the bit(s) comprised in the first bit sub-block and the number of the bit(s) associated with the second bit sub-block are used together to determine a first RB numerical value" means that: the number of the bit(s) comprised in the first bit sub-block and the number of the bit(s) associated with the second bit sub-block are used together by the first node or the second node in the present application to determine the first RB numerical value.

In one embodiment, the statement in the claims that "the number of the bit(s) comprised in the first bit sub-block and the number of the bit(s) associated with the second bit sub-block are used together to determine a first RB numerical value" means that: the number of the bit(s) comprised in the first bit sub-block and the number of the bit(s) associated with the second bit sub-block are used together to calculate the first RB numerical value.

In one embodiment, the statement in the claims that "the number of the bit(s) comprised in the first bit sub-block and the number of the bit(s) associated with the second bit sub-block are used together to determine a first RB numerical value" is implemented by means of the claim 7 in the present application.

In one embodiment, the statement in the claims that "the number of the bit(s) comprised in the first bit sub-block and the number of the bit(s) associated with the second bit sub-block are used together to determine a first RB numerical value" means that: a sum of the number of the bit(s) comprised in the first bit sub-block and the number of the bit(s) associated with the second bit sub-block is used to determine the first RB numerical value.

In one embodiment, the statement in the claims that "the number of the bit(s) comprised in the first bit sub-block and the number of the bit(s) associated with the second bit sub-block are used together to determine a first RB numerical value" means that: for a given maximum coding rate corresponding to the first bit sub-block, the first RB numerical value is linear with the number of the bit(s) comprised in the first bit sub-block, and the first RB numerical value is linear with the number of the bit(s) associated with the second bit sub-block.

In one embodiment, the statement in the claims that "the number of the bit(s) comprised in the first bit sub-block and the number of the bit(s) associated with the second bit sub-block are used together to determine a first RB numerical value" means that: the first RB numerical value is equal to a least numerical value of RBs that can carry both the first bit sub-block and the second bit sub-block.

In one embodiment, the statement in the claims that "the number of the bit(s) comprised in the first bit sub-block and the number of the bit(s) associated with the second bit sub-block are used together to determine a first RB numerical value" means that: the first RB numerical value is equal to a least numerical value of RBs that can carry both the first bit sub-block and the second bit sub-block, where the first bit sub-block and the second bit sub-block correspond to a same maximum coding rate.

In one embodiment, a resource occupied by the target PUCCH comprise at least one of a frequency-domain resource, a time-domain resource or a code-domain resource.

In one embodiment, a resource occupied by the target PUCCH comprise at least one of a frequency-domain resource, a time-domain resource or a sequence resource.

In one embodiment, a resource occupied by the target PUCCH only comprise a time-frequency resource.

In one embodiment, the target resource is a PUCCH resource.

In one embodiment, the target resource is a configured PUCCH resource.

In one embodiment, the target resource is a PUCCH resource configured by the first information block.

In one embodiment, the target resource is a PUCCH resource configured by a second "PUCCH-Config" IE comprised in an IE "PUCCH-ConfigurationList".

In one embodiment, the target resource is a PUCCH resource configured by a first "PUCCH-Config" IE comprised in an IE "PUCCH-ConfigurationList".

In one embodiment, the target resource only comprises a resource occupied by the target PUCCH.

In one embodiment, the target resource also comprises a resource other than the resource occupied by the target PUCCH.

In one embodiment, when the first RB numerical value is no less than the second RB numerical value, the target resource only comprises a resource occupied by the target PUCCH; when the first RB numerical value is less than the second RB numerical value, the target resource also comprises a resource other than the resource occupied by the target PUCCH.

In one embodiment, a value of a PUCCH resource Indicator (PRI) is used to determine the target resource.

In one embodiment, the second RB numerical value is a positive integer.

In one embodiment, the second RB numerical value is equal to a number of PRBs comprised by the target resource in frequency domain in a time-domain symbol.

In one embodiment, the second RB numerical value is equal to a number of VRBs comprised by the target resource in frequency domain in a time-domain symbol.

In one embodiment, the statement in the claims that "a relative magnitude of the first RB numerical value and the second RB numerical value is used together with the first factor to determine a number of bit(s) carried by the target PUCCH that belongs (belong) to the second bit sub-block" comprises the meaning that the relative magnitude of the first RB numerical value and the second RB numerical value is used together with the first factor by the first node in the present application to determine a number of bit(s) carried by the target PUCCH that belongs (belong) to the second bit sub-block.

In one embodiment, the statement in the claims that "a relative magnitude of the first RB numerical value and the second RB numerical value is used together with the first factor to determine a number of bit(s) carried by the target PUCCH that belongs (belong) to the second bit sub-block" comprises the meaning that the relative magnitude of the first RB numerical value and the second RB numerical value is used together with the first factor to calculate a number of bit(s) carried by the target PUCCH that belongs (belong) to the second bit sub-block.

In one embodiment, the statement in the claims that "a relative magnitude of the first RB numerical value and the second RB numerical value is used together with the first factor to determine a number of bit(s) carried by the target PUCCH that belongs (belong) to the second bit sub-block" comprises the meaning that the target PUCCH carries all bit(s) in the second bit sub-block; the relative magnitude of the first RB numerical value and the second RB numerical value is used together with the first factor to determine the number of bit(s) comprised in the second bit sub-block.

In one embodiment, the statement in the claims that "a relative magnitude of the first RB numerical value and the second RB numerical value is used together with the first factor to determine a number of bit(s) carried by the target PUCCH that belongs (belong) to the second bit sub-block" comprises the meaning that when the first RB numerical value is no greater than the second RB numerical value, the target PUCCH carries all bit(s) in the second bit sub-block; when the first RB numerical value is greater than the second RB numerical value, the first factor is used to determine the number of bit(s) comprised in the second bit sub-block carried by the target PUCCH.

In one embodiment, the statement in the claims that "a relative magnitude of the first RB numerical value and the second RB numerical value is used together with the first factor to determine a number of bit(s) carried by the target PUCCH that belongs (belong) to the second bit sub-block" is implemented by means of the claim 2 in the present application.

In one embodiment, the statement in the claims that "a relative magnitude of the first RB numerical value and the second RB numerical value is used together with the first factor to determine a number of bit(s) carried by the target PUCCH that belongs (belong) to the second bit sub-block" comprises the meaning that when the first RB numerical value is no greater than the second RB numerical value, the target PUCCH carries all bit(s) in the second bit sub-block; when the first RB numerical value is greater than the second RB numerical value, the first factor is used to determine whether the target PUCCH carries at least one bit in the second bit sub-block.

In one embodiment, the statement in the claims that "a relative magnitude of the first RB numerical value and the second RB numerical value is used together with the first factor to determine a number of bit(s) carried by the target PUCCH that belongs (belong) to the second bit sub-block" comprises the meaning that the target PUCCH carries all bit(s) in the second bit sub-block; when the first RB numerical value is no greater than the second RB numerical value, the second bit sub-block is a HARQ-ACK codebook; when the first RB numerical value is greater than the second RB numerical value, the first factor is used to determine the number of bit(s) comprised in the second bit sub-block, the second bit sub-block being generated by a HARQ-ACK codebook.

In one embodiment, the statement in the claims that "a relative magnitude of the first RB numerical value and the second RB numerical value is used together with the first factor to determine a number of bit(s) carried by the target PUCCH that belongs (belong) to the second bit sub-block" comprises the meaning that the target PUCCH carries all bit(s) in the second bit sub-block; when the first RB numerical value is no greater than the second RB numerical value, the second bit sub-block is a HARQ-ACK codebook attached with a CRC bit; when the first RB numerical value is greater than the second RB numerical value, the first factor is used to determine the number of bit(s) comprised in the second bit sub-block, the second bit sub-block being generated by a HARQ-ACK codebook.

In one embodiment, the statement in the claims that "a relative magnitude of the first RB numerical value and the second RB numerical value is used together with the first factor to determine a number of bit(s) carried by the target PUCCH that belongs (belong) to the second bit sub-block" comprises the meaning that when the first RB numerical value is no greater than the second RB numerical value, the target PUCCH carries all bit(s) in the second bit sub-block; when the first RB numerical value is greater than the second RB numerical value, a first product value is equal to a product of the first factor and the number of bit(s) comprised in the second bit sub-block, and a sum value of adding the first product value and the number of bit(s) comprised in the first bit sub-block is used to determine whether the target PUCCH carries at least one bit in the second bit sub-block.

In one embodiment, the statement in the claims that "a relative magnitude of the first RB numerical value and the second RB numerical value is used together with the first factor to determine a number of bit(s) carried by the target PUCCH that belongs (belong) to the second bit sub-block" comprises the meaning that the target PUCCH carries all bit(s) in the second bit sub-block; when the first RB numerical value is no greater than the second RB numerical value, the second bit sub-block is a HARQ-ACK codebook, or a HARQ-ACK codebook attached with a CRC bit; when the first RB numerical value is greater than the second RB numerical value, a first product value is equal to a product of the first factor and the number of bit(s) associated with the second bit sub-block, and a sum value of adding the first product value and the number of bit(s) comprised in the first bit sub-block is used to determine the number of bit(s) comprised in the second bit sub-block, the second bit sub-block being generated by a HARQ-ACK codebook.

Embodiment 2

Figure 2:
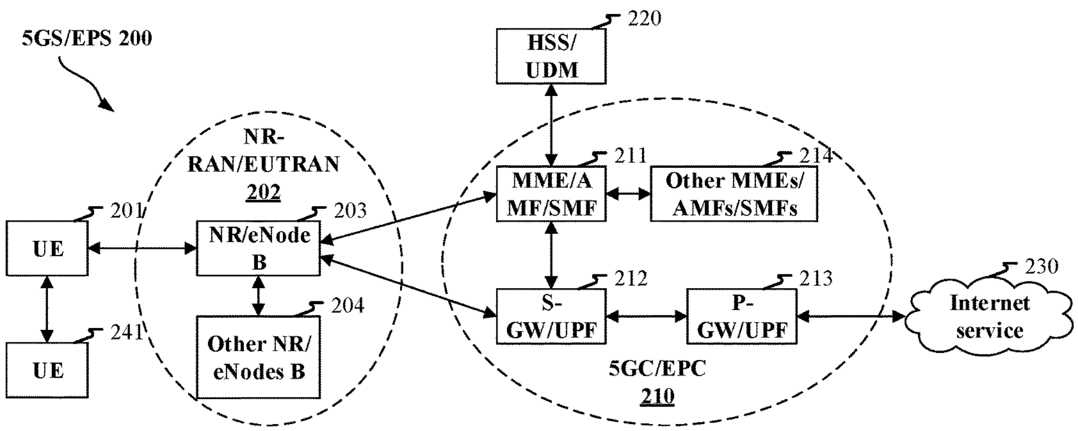
FIG. 2 illustrates a schematic diagram of a network architecture according to one embodiment of the present application.

Embodiment 2 illustrates a schematic diagram of a network architecture according to the present application, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System/Evolved Packet System (5GS/EPS) 200 or other suitable terminology. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN comprises an NR/evolved node B (gNB/eNB) 203 and other gNBs (eNBs) 204. The gNB (eNB) 203 provides UE 201 oriented user plane and control plane terminations. The gNB (eNB) 203 may be connected to other gNBs (eNBs) 204 via an Xn/X2 interface (for example, backhaul). The gNB (eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB (eNB) 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, test equipment, test instrument or test tools, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB (eNB) 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 201 supports multiplexed transmission of UCI associated with different priority levels.

In one embodiment, the gNB (eNB) 203 corresponds to the second node in the present application.

In one embodiment, the gNB (eNB) 203 supports multiplexed transmission of UCI associated with different priority levels.

Embodiment 3

Figure 3:
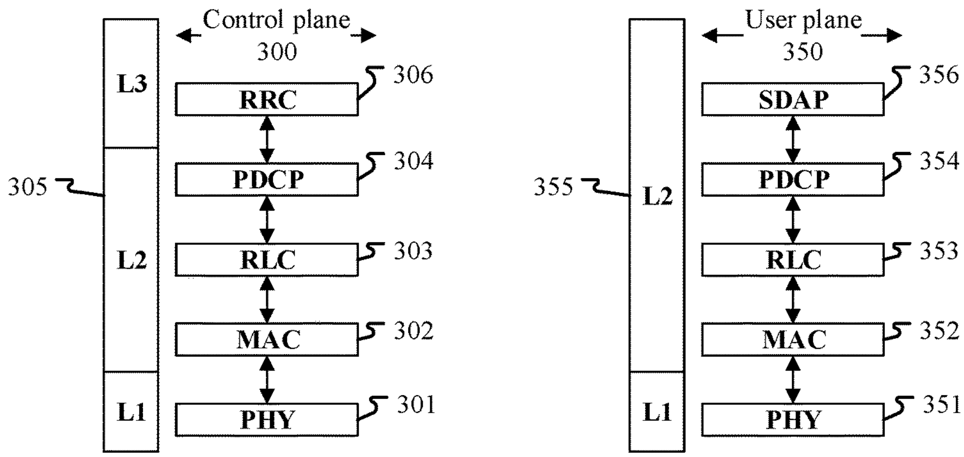
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, or gNB) and a second node (gNB, or UE) is represented by three layers, i.e., layer 1, layer 2 and layer 3. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information block in the present application is generated by the RRC 306, or the MAC 302, or the MAC 352, or the PHY 301, or the PHY 351.

In one embodiment, the target PUCCH in the present application is generated by the RRC 306, or the MAC 302, or the MAC 352, or the PHY 301, or the PHY 351.

In one embodiment, the first signaling in the present application is generated by the RRC 306, or the MAC 302, or the MAC 352, or the PHY 301, or the PHY 351.

Embodiment 4

Figure 4:
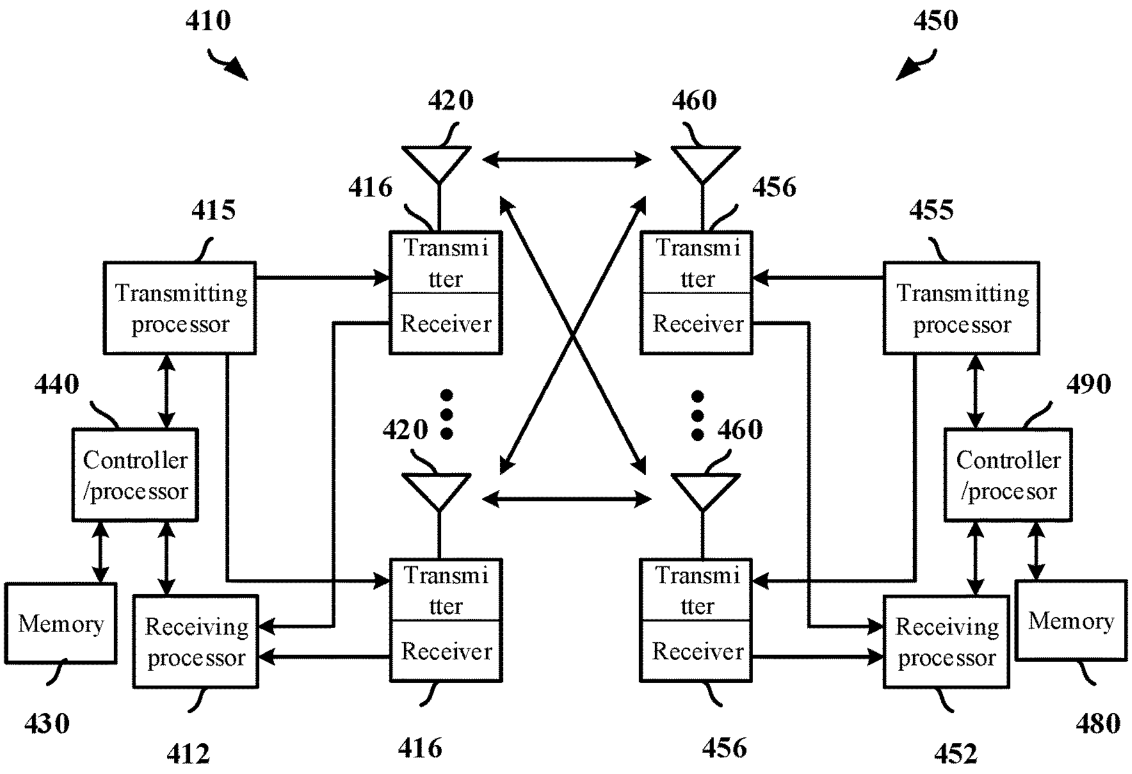
FIG. 4 illustrates a schematic diagram of a first node and a second node according to one embodiment of the present application.

Embodiment 4 illustrates a schematic diagram of a first node and a second node according to one embodiment of the present application, as shown in FIG. 4.

The first node (450) can comprise a controller/processor 490, a data source/buffer 480, a receiving processor 452, a transmitter/receiver 456 and a transmitting processor 455, where the transmitter/receiver 456 comprises an antenna 460.

The second node (410) can comprise a controller/processor 440, a data source/buffer 430, a receiving processor 412, a transmitter/receiver 416 and a transmitting processor 415, where the transmitter/receiver 416 comprises an antenna 420.

In Downlink (DL), a higher-layer packet, for instance higher-layer information contained in the first information block and in the first signaling (if the first signaling comprises higher-layer information) in the present application is provided to the controller/processor 440. The controller/processor 440 provides functions of the L2 layer and above. In DL, the controller/processor 440 provides header compression, encryption, packet segmentation and reordering, multiplexing between a logical channel and a transport channel and radio resource allocation of the first node 450 based on various priorities. The controller/processor 440 is responsible for HARQ operation, retransmission of a lost packet and a signaling to the first node 450, for example, higher-layer information contained in the first information block and in the first signaling (if the first signaling comprises higher-layer information) in the present application are generated in the controller/processor 440. The transmitting processor 415 provides various signal processing functions used for the L1 (that is, PHY), including coding, interleaving, scrambling, modulation, power control/allocation, precoding and physical layer control signaling generation, for instance, the first signaling (when the first signaling comprises physical-layer information) and a physical layer signal carrying the first information block in the present application are generated by the transmitting processor 415. The modulation symbols are divided into parallel streams and each stream is mapped onto a corresponding multicarrier subcarrier and/or multicarrier symbol, which are then mapped to the antenna 420 by the transmitting processor 415 via the transmitter 416 and transmitted in the form of radio frequency signals. At the receiving end, each receiver 456 receives a radio frequency signal via a corresponding antenna 460, resumes baseband information modulated onto the radio frequency carriers and provides the baseband information to the receiving processor 452. The receiving processor 452 performs various signal reception processing functions of the L1 layer. The signal reception processing functions include receiving a physical layer signal carrying the first information block and a first signaling in the present application and demodulating multicarrier symbols in multicarrier symbol flows based on each modulation scheme (e.g., BPSK, QPSK), de-scrambling, decoding and de-interleaving to recover data or control signal transmitted by the second node 410 on a physical channel, and then providing the data and control signal to the controller/processor 490. The controller/processor 490 is in charge of the L2 and layers above, the controller/processor 490 interpreting higher-layer information contained in the first information block and higher-layer information contained in the first signaling (if the first signaling comprises higher-layer information). The controller/processor can be associated with a memory 480 that stores program code and data. The memory 480 can be called a computer readable medium.

In UL transmission, similar to the DL transmission, higher-layer information upon generation in the controller/processor 490 are used by the transmitting processor 455 for various signal transmitting processing functions used for the L1 (that is, PHY). The target PUCCH in the present application are generated by the transmitting processor 455 and then mapped by the transmitting processor 455 to the antenna 460 via the transmitter 456 to be sent out in the form of radio frequency signals. The receiver 416 receives a radio frequency signal via a corresponding antenna 420, each resumes baseband information modulated onto the radio frequency carriers and provides the baseband information to the receiving processor 412. The receiving processor 412 provides various signal receiving processing functions used for the L1 layer (that is PHY), including receiving physical-layer signals of a target PUCCH in the present application and providing data and/or control signal to the controller/processor 440. The controller/processor 440 provides functions of the L2 layer, including interpreting higher-layer information. The controller/processor can be associated with a buffer 430 that stores program code and data, the buffer 430 may be called a computer readable medium.

In one embodiment, the first node 450 comprises at least one processor and at least one memory. The at least one memory includes computer program codes. The at least one memory and the computer program codes are configured to be used in collaboration with the at least one processor. The first node 450 at least receives a first information block, the first information block being used to determine a first factor; and transmits a target PUCCH, the target PUCCH at least carrying a first bit sub-block, the first bit sub-block comprising at least one bit; herein, the target PUCCH carries a non-negative integer number of bit(s) belonging to a second bit sub-block, the second bit sub-block comprising at least one bit, the first bit sub-block and the second bit sub-block being different; a sum of a number of bit(s) comprised in the first bit sub-block and a number of bit(s) associated with the second bit sub-block is greater than 2, where the number of the bit(s) comprised in the first bit sub-block and the number of the bit(s) associated with the second bit sub-block are used together to determine a first RB numerical value; a resource occupied by the target PUCCH belongs to a target resource, with a number of RBs comprised in the target resource in frequency domain being equal to a second RB numerical value; a relative magnitude of the first RB numerical value and the second RB numerical value is used together with the first factor to determine a number of bit(s) carried by the target PUCCH that belongs (belong) to the second bit sub-block.

In one embodiment, the first node 450 comprises a memory that stores a computer readable instruction program. The computer readable instruction program generates an action when executed by at least one processor. The action includes: receiving a first information block, the first information block being used to determine a first factor; and transmitting a target PUCCH, the target PUCCH at least carrying a first bit sub-block, the first bit sub-block comprising at least one bit; herein, the target PUCCH carries a non-negative integer number of bit(s) belonging to a second bit sub-block, the second bit sub-block comprising at least one bit, the first bit sub-block and the second bit sub-block being different; a sum of a number of bit(s) comprised in the first bit sub-block and a number of bit(s) associated with the second bit sub-block is greater than 2, where the number of the bit(s) comprised in the first bit sub-block and the number of the bit(s) associated with the second bit sub-block are used together to determine a first RB numerical value; a resource occupied by the target PUCCH belongs to a target resource, with a number of RBs comprised in the target resource in frequency domain being equal to a second RB numerical value; a relative magnitude of the first RB numerical value and the second RB numerical value is used together with the first factor to determine a number of bit(s) carried by the target PUCCH that belongs (belong) to the second bit sub-block.

In one embodiment, the second node 410 comprises at least one processor and at least one memory. The at least one memory comprises computer program codes; the at least one memory and the computer program codes are configured to be used in collaboration with the at least one processor. The second node 410 at least transmits a first information block, the first information block being used to indicate a first factor; and receives a target PUCCH, the target PUCCH at least carrying a first bit sub-block, the first bit sub-block comprising at least one bit; herein, the target PUCCH carries a non-negative integer number of bit(s) belonging to a second bit sub-block, the second bit sub-block comprising at least one bit, the first bit sub-block and the second bit sub-block being different; a sum of a number of bit(s)

comprised in the first bit sub-block and a number of bit(s) associated with the second bit sub-block is greater than 2, where the number of the bit(s) comprised in the first bit sub-block and the number of the bit(s) associated with the second bit sub-block are used together to determine a first RB numerical value; a resource occupied by the target PUCCH belongs to a target resource, with a number of RBs comprised in the target resource in frequency domain being equal to a second RB numerical value; a relative magnitude of the first RB numerical value and the second RB numerical value is used together with the first factor to determine a number of bit(s) carried by the target PUCCH that belongs (belong) to the second bit sub-block.

In one embodiment, the second node 410 comprises a memory that stores a computer readable instruction program. The computer readable instruction program generates an action when executed by at least one processor. The action includes: transmitting a first information block, the first information block being used to indicate a first factor; and receiving a target PUCCH, the target PUCCH at least carrying a first bit sub-block, the first bit sub-block comprising at least one bit; herein, the target PUCCH carries a non-negative integer number of bit(s) belonging to a second bit sub-block, the second bit sub-block comprising at least one bit, the first bit sub-block and the second bit sub-block being different; a sum of a number of bit(s) comprised in the first bit sub-block and a number of bit(s) associated with the second bit sub-block is greater than 2, where the number of the bit(s) comprised in the first bit sub-block and the number of the bit(s) associated with the second bit sub-block are used together to determine a first RB numerical value; a resource occupied by the target PUCCH belongs to a target resource, with a number of RBs comprised in the target resource in frequency domain being equal to a second RB numerical value; a relative magnitude of the first RB numerical value and the second RB numerical value is used together with the first factor to determine a number of bit(s) carried by the target PUCCH that belongs (belong) to the second bit sub-block.

In one embodiment, the first node 450 is a UE.

In one embodiment, the first node 450 is a UE supporting multiplexed transmission of information associated with various priority levels.

In one embodiment, the second node 410 is a base station (gNB/eNB).

In one embodiment, the second node 410 is a base station supporting multiplexed transmission of information associated with various priority levels.

In one embodiment, the receiver 456 (comprising the antenna 460), the receiving processor 452 and the controller/processor 490 are used for receiving the first information block in the present application.

In one embodiment, the transmitter 456 (comprising the antenna 460) and the transmitting processor 455 are used for transmitting the target PUCCH in the present application.

In one embodiment, the receiver 456 (comprising the antenna 460) and the receiving processor 452 are used for receiving the first signaling in the present application.

In one embodiment, the receiver 456 (comprising the antenna 460), the receiving processor 452 and the controller/processor 490 are used for receiving the first signaling in the present application.

In one embodiment, the transmitter 416 (comprising the antenna 420), the transmitting processor 415 and the controller/processor 440 are used for transmitting the first information block in the present application.

In one embodiment, the receiver 416 (comprising the antenna 420) and the receiving processor 412 are used for receiving the target PUCCH in the present application.

In one embodiment, the transmitter 416 (comprising the antenna 420) and the transmitting processor 415 are used for transmitting the first signaling in the present application.

In one embodiment, the transmitter 416 (comprising the antenna 420), the transmitting processor 415 and the controller/processor 440 are used for transmitting the first signaling in the present application.

Embodiment 5

Figure 5:
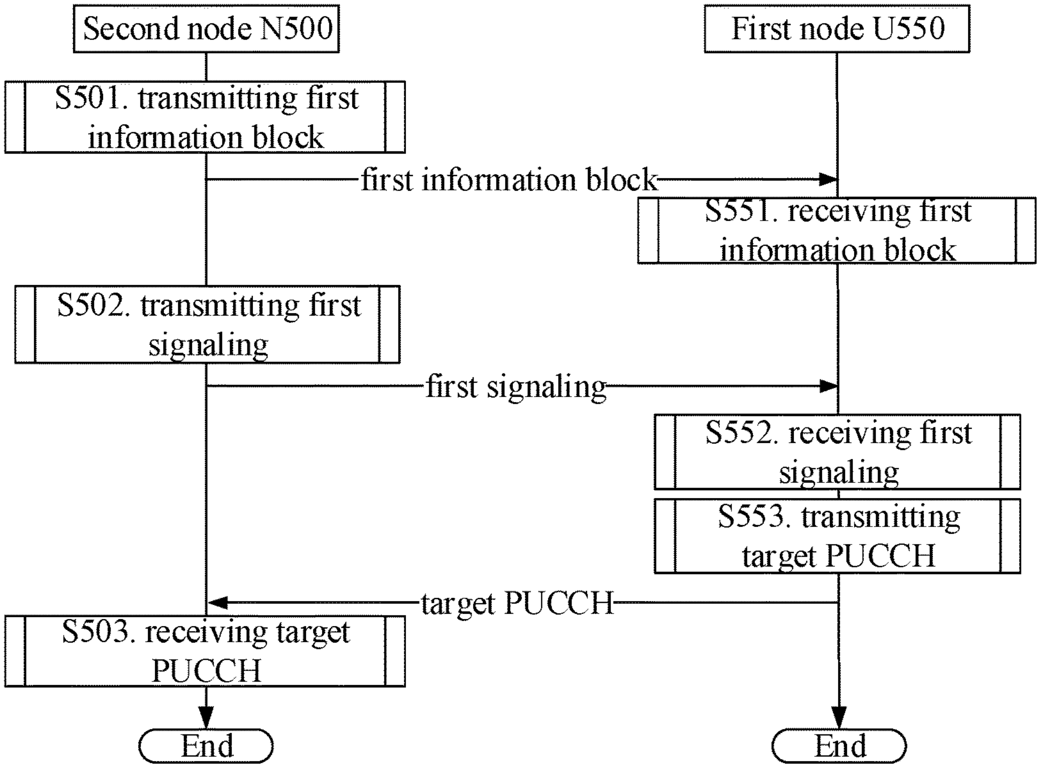
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, a second node N500 is a maintenance base station for a serving cell of a first node U550. It should be particularly noted that the sequence illustrated herein does not set any limit to the signal transmission order or implementation order in the present application.

The second node N500 transmits a first information block in step S501; transmits a first signaling in step S502; and receives a target PUCCH in step S503.

The first node U500 receives a first information block in step S551; receives a first signaling in step S552; and transmits a target PUCCH in step S553.

In Embodiment 5, the first information block is used to determine a first factor; and the target PUCCH at least carries a first bit sub-block, the first bit sub-block comprising at least one bit; herein, the target PUCCH carries a non-negative integer number of bit(s) belonging to a second bit sub-block, the second bit sub-block comprising at least one bit, the first bit sub-block and the second bit sub-block being different; a sum of a number of bit(s) comprised in the first bit sub-block and a number of bit(s) associated with the second bit sub-block is greater than 2, where the number of the bit(s) comprised in the first bit sub-block and the number of the bit(s) associated with the second bit sub-block are used together to determine a first RB numerical value; a resource occupied by the target PUCCH belongs to a target resource, with a number of RBs comprised in the target resource in frequency domain being equal to a second RB numerical value; a relative magnitude of the first RB numerical value and the second RB numerical value is used together with the first factor to determine a number of bit(s) carried by the target PUCCH that belongs (belong) to the second bit sub-block; the first signaling is used to determine the target resource from a target resource set, the target resource set comprising at least one PUCCH resource; at least the first two of the number of the bit(s) comprised in the first bit sub-block, the number of the bit(s) associated with the second bit sub-block and the first factor are used to determine the target resource set.

In one embodiment, the first signaling is transmitted via an air interface or a radio interface.

In one embodiment, the first signaling comprises all or part of a Higher Layer signaling or a physical layer signaling.

In one embodiment, the first information comprises all or part of a Radio Resource Control (RRC) layer signaling or a Medium Access Control (MAC) layer signaling.

In one embodiment, the first signaling is Cell Specific or UE-Specific.

In one embodiment, the first signaling is Per BWP Configured, where BWP refers to Bandwidth Part.

In one embodiment, the first signaling comprises all or partial fields in a Downlink Control Information (DCI) signaling.

In one embodiment, the first signaling comprises a PRI in a DCI Format.

In one embodiment, the first signaling is carried by a PDCCH.

In one embodiment, the first signaling is carried by a latest PDCCH associated with the target PUCCH.

In one embodiment, the statement in the claims that "the first signaling is used to determine the target resource from a target resource set" comprises the meaning that the first signaling is used by the first node in the present application to determine the target resource from the target resource set.

In one embodiment, the statement in the claims that "the first signaling is used to determine the target resource from a target resource set" comprises the meaning that the first signaling is used for explicitly or implicitly indicating the target resource in the target resource set.

In one embodiment, the statement in the claims that "the first signaling is used to determine the target resource from a target resource set" comprises the meaning that the first signaling is used for explicitly or implicitly indicating an index or an ID of the target resource in the target resource set.

In one embodiment, the statement in the claims that "the first signaling is used to determine the target resource from a target resource set" comprises the meaning that a PRI field carried by the first signaling and an index of a starting/first Control Channel Element (CCE) occupied by a PDCCH carrying the first signaling are used together to determine an index or an ID of the target resource in the target resource set.

Embodiment 6

Figure 6:
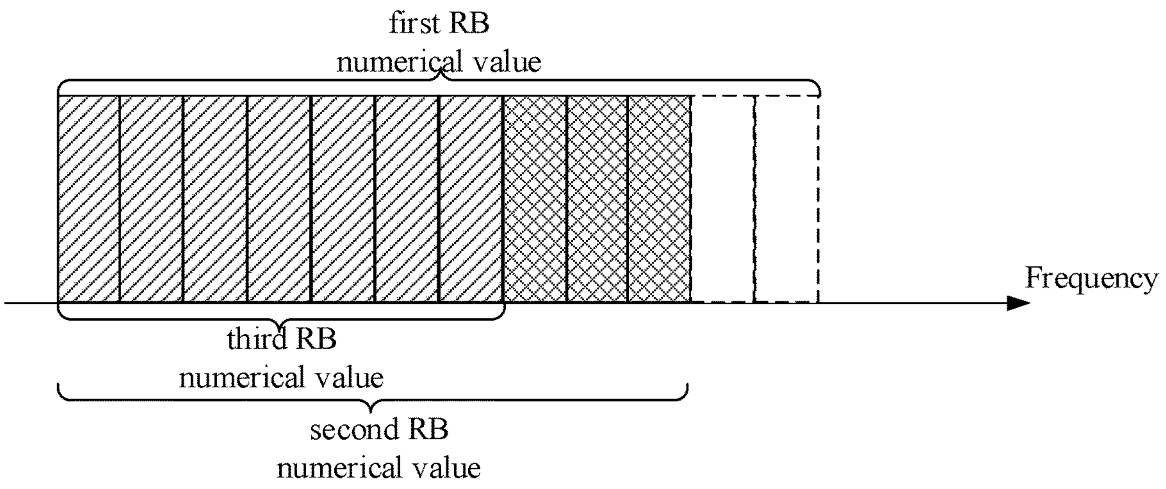
FIG. 6 illustrates a schematic diagram of a relationship between a second RB numerical value and a third RB numerical value according to one embodiment of the present application.

Embodiment 6 illustrates a schematic diagram of a relationship between a second RB numerical value and a third RB numerical value according to one embodiment of the present application, as shown in FIG. 6. In FIG. 6, the horizontal axis represents frequency or the direction of indexes of PRBs. Each rectangular box represents an RB, each said rectangular box filled with slashed represents an RB carrying the first bit sub-block, and each said rectangular box filled with crosses represents an RB carrying a second bit sub-block.

In Embodiment 6, a coding rate corresponding to the first bit sub-block in the present application and the number of the bit(s) comprised in the first bit sub-block are used together to determine a third RB numerical value; when the first RB numerical value in the present application is no greater than the second RB numerical value in the present application, the target PUCCH in the present application carries all bit(s) belonging to the second bit sub-block in the present application; when the first RB numerical value is greater than the second RB numerical value, a difference between the second RB numerical value and the third RB numerical value is used together with the first factor to determine the number of the bit(s) carried by the target PUCCH that belongs (belong) to the second bit sub-block.

In one embodiment, the statement in the claims that "a coding rate corresponding to the first bit sub-block" comprises: a coding rate corresponding to a priority index value of the first bit sub-block.

In one embodiment, the statement in the claims that "a coding rate corresponding to the first bit sub-block" comprises: a configured maximum coding rate used for Rate Matching of the first bit sub-block.

In one embodiment, the statement in the claims that "a coding rate corresponding to the first bit sub-block" comprises: a maximum coding rate in Rel-16 configured by a second "PUCCH-Config" IE comprised in an IE "PUCCH-ConfigurationList" configuring the target resource.

In one embodiment, the statement in the claims that "a coding rate corresponding to the first bit sub-block" comprises: a maximum coding rate in Rel-16 configured by a "PUCCH-Config" IE configuring resources of a PUCCH carrying the first bit sub-block.

In one embodiment, the statement in the claims that "a coding rate corresponding to the first bit sub-block" comprises: a first maximum coding rate configured by a "PUCCH-Config" IE configuring resources of a PUCCH carrying the first bit sub-block.

In one embodiment, the statement in the claims that "a coding rate corresponding to the first bit sub-block" comprises: a maximum coding rate other than a Rel-17 maximum coding rate configured by a "PUCCH-Config" IE configuring resources of a PUCCH carrying the first bit sub-block.

In one embodiment, a coding rate corresponding to the first bit sub-block is a configured maximum coding rate.

In one embodiment, the first information block is used for explicitly or implicitly indicating a coding rate corresponding to the first bit sub-block.

In one embodiment, a signaling or an IE or a field other than the first information block is used for implicitly or explicitly indicating a coding rate corresponding to the first bit sub-block.

In one embodiment, the statement in the claims that "a coding rate corresponding to the first bit sub-block and the number of the bit(s) comprised in the first bit sub-block are used together to determine a third RB numerical value" means that: the coding rate corresponding to the first bit sub-block and the number of the bit(s) comprised in the first bit sub-block are used together by the first node or the second node in the present application to determine the third RB numerical value.

In one embodiment, the statement in the claims that "a coding rate corresponding to the first bit sub-block and the number of the bit(s) comprised in the first bit sub-block are used together to determine a third RB numerical value" means that: the coding rate corresponding to the first bit sub-block and the number of the bit(s) comprised in the first bit sub-block are used together to directly or indirectly calculate the third RB numerical value.

In one embodiment, the statement in the claims that "a coding rate corresponding to the first bit sub-block and the number of the bit(s) comprised in the first bit sub-block are used together to determine a third RB numerical value" means that: the third RB numerical value is equal to a least numerical value of RBs that enables the first bit sub-block to be transmitted with a coding rate corresponding to the first bit sub-block.

In one embodiment, the statement in the claims that "a coding rate corresponding to the first bit sub-block and the number of the bit(s) comprised in the first bit sub-block are used together to determine a third RB numerical value" means that: the third RB numerical value is equal to a least numerical value of RBs required for carrying the first bit sub-block with a coding rate corresponding to the first bit sub-block.

In one embodiment, the statement in the claims that "a coding rate corresponding to the first bit sub-block and the number of the bit(s) comprised in the first bit sub-block are used together to determine a third RB numerical value" means that: the third RB numerical value is equal to a quantized value of a ratio of the number of bit(s) comprised in the first bit sub-block to a coding rate corresponding to the first bit sub-block.

In one embodiment, the statement in the claims that "a coding rate corresponding to the first bit sub-block and the number of the bit(s) comprised in the first bit sub-block are used together to determine a third RB numerical value" means that: the third RB numerical value is equal to a ratio of a number of bit(s) comprised in the first bit sub-block to a number of bit(s) in the first bit sub-block that can be carried by each RB being rounded up to a nearest integer; a coding rate corresponding to the first bit sub-block is used to determine the number of bit(s) in the first bit sub-block that can be carried by the each RB.

In one embodiment, the statement in the claims that "a coding rate corresponding to the first bit sub-block and the number of the bit(s) comprised in the first bit sub-block are used together to determine a third RB numerical value" means that: the third RB numerical value is equal to a ratio of a number of bit(s) comprised in the first bit sub-block to a number of bit(s) in the first bit sub-block that can be carried by each RB being rounded up to a nearest integer; the number of bit(s) in the first bit sub-block that can be carried by the each RB is equal to a product of a coding rate corresponding to the first bit sub-block, a modulation order of the target PUCCH and a number of resource elements comprised by the target resource in an RB used for control information bits.

In one embodiment, the statement in the claims that "a difference between the second RB numerical value and the third RB numerical value is used together with the first factor to determine the number of the bit(s) carried by the target PUCCH that belongs (belong) to the second bit sub-block" comprises the meaning that the difference between the second RB numerical value and the third RB numerical value is used together with the first factor by the first node or the second node in the present application to determine a number of bit(s) carried by the target PUCCH that belongs (belong) to the second bit sub-block.

In one embodiment, the statement in the claims that "a difference between the second RB numerical value and the third RB numerical value is used together with the first factor to determine the number of the bit(s) carried by the target PUCCH that belongs (belong) to the second bit sub-block" comprises the meaning that the difference between the second RB numerical value and the third RB numerical value is used together with the first factor to calculate a number of bit(s) carried by the target PUCCH that belongs (belong) to the second bit sub-block.

In one embodiment, the statement in the claims that "a difference between the second RB numerical value and the third RB numerical value is used together with the first factor to determine the number of the bit(s) carried by the target PUCCH that belongs (belong) to the second bit sub-block" comprises the meaning that the difference between the second RB numerical value and the third RB numerical value is used together with the first factor to determine whether the target PUCCH carries at least one bit belonging to the second bit sub-block.

In one embodiment, the statement in the claims that "a difference between the second RB numerical value and the third RB numerical value is used together with the first factor to determine the number of the bit(s) carried by the target PUCCH that belongs (belong) to the second bit sub-block" comprises the meaning that the first factor and the number of the bit(s) comprised in the second bit sub-block are used together to determine a fourth RB numerical value; when the fourth RB numerical value is greater than a difference between the second RB numerical value and the third RB numerical value, the target PUCCH does not carry any bit in the second bit sub-block; when the fourth RB numerical value is no greater than a difference between the second RB numerical value and the third RB numerical value, the target PUCCH carries all bit(s) belonging to the second bit sub-block.

In one embodiment, the statement in the claims that "a difference between the second RB numerical value and the third RB numerical value is used together with the first factor to determine the number of the bit(s) carried by the target PUCCH that belongs (belong) to the second bit sub-block" comprises the meaning that the first factor and the number of the bit(s) comprised in the second bit sub-block are used together to determine a fourth RB numerical value; when the fourth RB numerical value is greater than a difference between the second RB numerical value and the third RB numerical value, the first factor is used to determine the number of bit(s) carried by the target PUCCH that belongs (belong) to the second bit sub-block; when the fourth RB numerical value is no greater than a difference between the second RB numerical value and the third RB numerical value, the target PUCCH carries all bit(s) belonging to the second bit sub-block.

In one embodiment, the statement in the claims that "a difference between the second RB numerical value and the third RB numerical value is used together with the first factor to determine the number of the bit(s) carried by the target PUCCH that belongs (belong) to the second bit sub-block" comprises the meaning that the first factor and the number of the bit(s) comprised in the second bit sub-block are used together to determine a fourth RB numerical value; when the fourth RB numerical value is greater than a difference between the second RB numerical value and the third RB numerical value, the target PUCCH carries partial bit(s) belonging to the second bit sub-block; when the fourth RB numerical value is no greater than a difference between the second RB numerical value and the third RB numerical value, the target PUCCH carries all bits belonging to the second bit sub-block.

In one embodiment, the statement in the claims that "a difference between the second RB numerical value and the third RB numerical value is used together with the first factor to determine the number of the bit(s) carried by the target PUCCH that belongs (belong) to the second bit sub-block" comprises the meaning that the number of the bit(s) carried by the target PUCCH that belongs (belong) to the second bit sub-block is equal to a maximum number of bit(s) in the second bit sub-block that can be carried by RB sets of which the number equals the second RB numerical value that satisfy the first factor.

In one embodiment, the statement in the claims that "a difference between the second RB numerical value and the third RB numerical value is used together with the first factor to determine the number of the bit(s) carried by the target PUCCH that belongs (belong) to the second bit sub-block" comprises the meaning that a difference between the second RB numerical value and the third RB numerical value is equal to a fifth RB numerical value; the number of the bit(s) carried by the target PUCCH that belongs (belong) to the second bit sub-block is equal to a maximum number of bit(s) in the second bit sub-block that can be carried by RB sets of which the number equals the fifth RB numerical value.

In one embodiment, the statement in the claims that "a difference between the second RB numerical value and the third RB numerical value is used together with the first factor to determine the number of the bit(s) carried by the target PUCCH that belongs (belong) to the second bit sub-block" comprises the meaning that a difference between the second RB numerical value and the third RB numerical value is equal to a fifth RB numerical value; for a given said first factor, the number of the bit(s) carried by the target PUCCH that belongs (belong) to the second bit sub-block is linear with the fifth RB numerical value, and the first factor is used to determine a coefficient of linear correlation between the number of the bit(s) carried by the target PUCCH that belongs (belong) to the second bit sub-block and the fifth RB numerical value.

In one embodiment, the statement in the claims that "a difference between the second RB numerical value and the third RB numerical value is used together with the first factor to determine the number of the bit(s) carried by the target PUCCH that belongs (belong) to the second bit sub-block" comprises the meaning that a difference between the second RB numerical value and the third RB numerical value is equal to a fifth RB numerical value; the first factor is used to determine a coding rate corresponding to the first bit sub-block; for a given coding rate corresponding to the first bit sub-block, the number of the bit(s) carried by the target PUCCH that belongs (belong) to the second bit sub-block is linear with the fifth RB numerical value, and the coding rate corresponding to the first bit sub-block is used to determine a coefficient of linear correlation between the number of the bit(s) carried by the target PUCCH that belongs (belong) to the second bit sub-block and the fifth RB numerical value.

Embodiment 7

Figure 7:
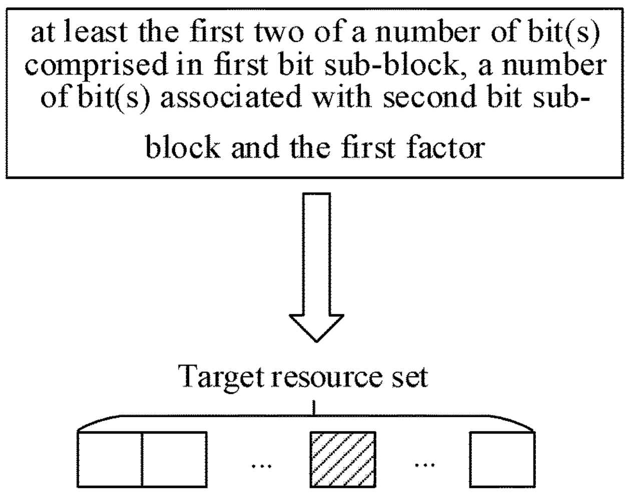
FIG. 7 illustrates a schematic diagram of a relationship between a target resource and a target resource set according to one embodiment of the present application.

Embodiment 7 illustrates a schematic diagram of a relationship between a target resource and a target resource set according to one embodiment of the present application, as shown in FIG. 7. In FIG. 7, each small box represents a PUCCH resource comprised in a target resource set, among them the slash-filled box represents a target resource.

In Embodiment 7, the first signaling in the present application is used to determine the target resource in the present application from a target resource set, the target resource set comprising at least one PUCCH resource, at least the first two of the number of the bit(s) comprised in the first bit sub-block in the present application, the number of the bit(s) associated with the second bit sub-block in the present application and the first factor in the present application being used to determine the target resource set.

In one embodiment, the target resource set is a PUCCH resource set.

In one embodiment, the target resource set corresponds to an interval of numbers of UCI Payload bits.

In one embodiment, the target resource set corresponds to a range of numbers of UCI Payload bits.

In one embodiment, an interval of numbers of UCI Payload bits corresponding to the target resource set is configurable.

In one embodiment, an interval of numbers of UCI Payload bits corresponding to the target resource set is configured by the first information block in the present application.

In one embodiment, the target resource set is comprised of multiple PUCCH resources.

In one embodiment, PUCCH resources comprised in the target resource set are configured by the first information block in the present application.

In one embodiment, the statement in the claims that "at least the first two of the number of the bit(s) comprised in the first bit sub-block, the number of the bit(s) associated with the second bit sub-block and the first factor being used to determine the target resource set" comprises the meaning as follows: at least the first two of the number of the bit(s) comprised in the first bit sub-block, the number of the bit(s) associated with the second bit sub-block and the first factor are used by the first node in the present application to determine the target resource set.

In one embodiment, the statement in the claims that "at least the first two of the number of the bit(s) comprised in the first bit sub-block, the number of the bit(s) associated with the second bit sub-block and the first factor being used to determine the target resource set" comprises the meaning as follows: only the first two of the number of the bit(s) comprised in the first bit sub-block, the number of the bit(s) associated with the second bit sub-block and the first factor are used to determine the target resource set.

In one embodiment, the statement in the claims that "at least the first two of the number of the bit(s) comprised in the first bit sub-block, the number of the bit(s) associated with the second bit sub-block and the first factor being used to determine the target resource set" comprises the meaning as follows: a sum of the number of the bit(s) comprised in the first bit sub-block and the number of the bit(s) associated with the second bit sub-block is used to determine the target resource set.

In one embodiment, the statement in the claims that "at least the first two of the number of the bit(s) comprised in the first bit sub-block, the number of the bit(s) associated with the second bit sub-block and the first factor being used to determine the target resource set" comprises the meaning as follows: a sum of a product of the number of the bit(s) associated with the second bit sub-block and the first factor being added by the number of the bit(s) comprised in the first bit sub-block is used to determine the target resource set.

In one embodiment, the statement in the claims that "at least the first two of the number of the bit(s) comprised in the first bit sub-block, the number of the bit(s) associated with the second bit sub-block and the first factor being used to determine the target resource set" comprises the meaning as follows: all of the number of the bit(s) comprised in the first bit sub-block, the number of the bit(s) associated with the second bit sub-block and the first factor are used to determine the target resource set.

In one embodiment, the statement in the claims that "at least the first two of the number of the bit(s) comprised in the first bit sub-block, the number of the bit(s) associated with the second bit sub-block and the first factor being used to determine the target resource set" comprises the meaning as follows: the target resource set is one of K1 resource sets, the K1 resource sets being signaling configured or pre-defined, K1 being a positive integer greater than 1; at least the first two of the number of the bit(s) comprised in the first bit sub-block, the number of the bit(s) associated with the second bit sub-block and the first factor are used to determine the target resource set out of the K1 resource sets according to a corresponding or mapping relationship.

In one embodiment, the statement in the claims that "at least the first two of the number of the bit(s) comprised in the first bit sub-block, the number of the bit(s) associated with the second bit sub-block and the first factor being used to determine the target resource set" comprises the meaning as follows: the target resource set is one of K1 resource sets, the K1 resource sets being signaling configured or pre-defined, K1 being a positive integer greater than 1; the K1 resource sets respectively correspond to K1 value ranges, the sum of the number of the bit(s) comprised in the first bit sub-block and the number of the bit(s) associated with the second bit sub-block belongs to a target value range, the target value range being one of the K1 value ranges, the target resource set being a resource set corresponding to the target value range among the K1 resource sets. In one subsidiary embodiment of the above embodiment, the K1 value ranges are configurable. In one subsidiary embodiment of the above embodiment, the K1 value ranges are pre-defined. In one subsidiary embodiment of the above embodiment, the K1 value ranges are configured by one or more fields comprised in the first information block.

In one embodiment, the statement in the claims that "at least the first two of the number of the bit(s) comprised in the first bit sub-block, the number of the bit(s) associated with the second bit sub-block and the first factor being used to determine the target resource set" comprises the meaning as follows: the target resource set is one of K1 resource sets, the K1 resource sets being signaling configured or pre-defined, K1 being a positive integer greater than 1; the K1 resource sets respectively correspond to K1 value ranges, the sum of a product of the number of the bit(s) associated with the second bit sub-block and the first factor being added by the number of the bit(s) comprised in the first bit sub-block belongs to a target value range, the target value range being one of the K1 value ranges, the target resource set being a resource set corresponding to the target value range among the K1 resource sets. In one subsidiary embodiment of the above embodiment, the K1 value ranges are configurable. In one subsidiary embodiment of the above embodiment, the K1 value intervals are pre-defined. In one subsidiary embodiment of the above embodiment, the K1 value intervals are configured by one or more fields comprised in the first information block.

Embodiment 8

Figure 8:
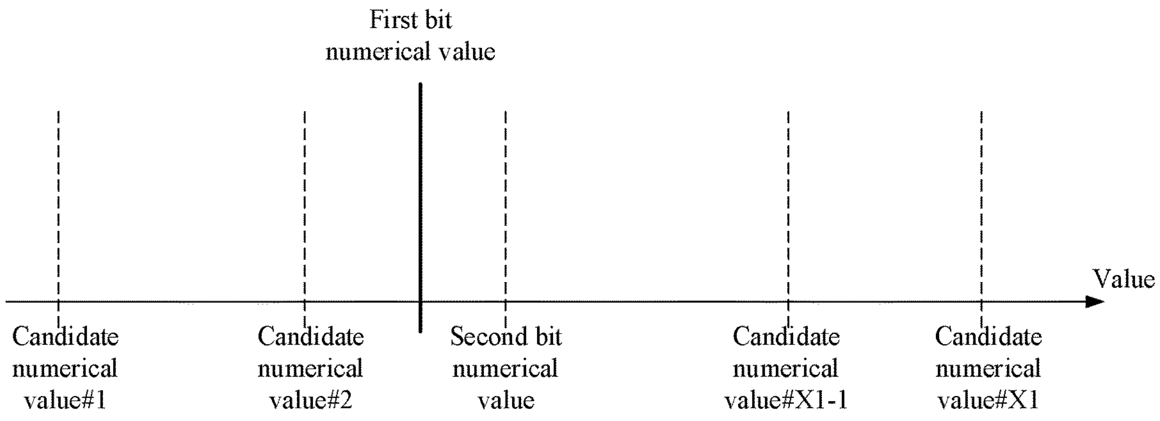
FIG. 8 illustrates a schematic diagram of X1 candidate numerical values according to one embodiment of the present application.

Embodiment 8 illustrates a schematic diagram of X1 candidate numerical values according to one embodiment of the present application, as shown in FIG. 8. In FIG. 8, the horizontal axis represents values, each broken line represents a candidate numerical value among X1 candidate numerical values, and the thick solid line represents a first bit numerical value.

In Embodiment 8, a first HARQ bit block is used for generating the second bit sub-block in the present application, the first HARQ bit block comprising at least one HARQ-ACK bit, a first bit numerical value is equal to a number of bit(s) comprised in the first HARQ bit block; a second bit numerical value is equal to a number of bit(s) comprised in the second bit sub-block, and the second bit numerical value is equal to one of X1 candidate numerical values, among the X1 candidate numerical values any candidate numerical value is a non-negative integer, where X1 is a positive integer greater than 1; the first bit numerical value is used to determine the second bit numerical value out of the X1 candidate numerical values.

In one embodiment, the first HARQ bit block is a HARQ-ACK codebook or part of a HARQ-ACK codebook.

In one embodiment, the first HARQ bit block comprises a HARQ-ACK codebook with an attached CRC bit.

In one embodiment, the first HARQ bit block is a HARQ-ACK sub-codebook.

In one embodiment, the first HARQ bit block only comprises a HARQ-ACK bit.

In one embodiment, the first HARQ bit block also comprises a bit other than a HARQ-ACK bit.

In one embodiment, the first HARQ bit block also comprises a CRC bit.

In one embodiment, the first HARQ bit block also comprises a padding bit.

In one embodiment, the statement in the claims that "a first HARQ bit block is used for generating the second bit sub-block" comprises the meaning that the first HARQ bit block is used by the first node in the present application for generating the second bit sub-block.

In one embodiment, the statement in the claims that "a first HARQ bit block is used for generating the second bit sub-block" comprises the meaning that the second bit sub-block is the first HARQ bit block.

In one embodiment, the statement in the claims that "a first HARQ bit block is used for generating the second bit sub-block" comprises a meaning that bit(s) comprised in the first HARQ bit block goes/go through processing or transformation to generate the second bit sub-block.

In one embodiment, the statement in the claims that "a first HARQ bit block is used for generating the second bit sub-block" comprises a meaning that bit(s) comprised in the first HARQ bit block goes/go through coding to generate the second bit sub-block.

In one embodiment, the first bit numerical value is no greater than the second bit numerical value.

In one embodiment, the first bit numerical value is no less than the second bit numerical value.

In one embodiment, the first bit numerical value may or may not be equal to the second bit numerical value.

In one embodiment, the statement in the claims that "a first HARQ bit block is used for generating the second bit sub-block" comprises a meaning that the first bit numerical value is no greater than the second bit numerical value; when the first bit numerical value is less than the second bit numerical value, the second bit sub-block is generated by the first HARQ bit block through bit padding; when the first bit numerical value is equal to the second bit numerical value, the second bit sub-block is the first HARQ bit block.

In one embodiment, the statement in the claims that "a first HARQ bit block is used for generating the second bit sub-block" comprises a meaning that the first bit numerical value is no less than the second bit numerical value; when the first bit numerical value is greater than the second bit numerical value, the second bit sub-block is generated by the first HARQ bit block through bit compression; when the first bit numerical value is equal to the second bit numerical value, the second bit sub-block is the first HARQ bit block.

In one embodiment, the statement in the claims that "a first HARQ bit block is used for generating the second bit sub-block" is implemented by means of the claim 5 in the present application.

In one embodiment, the statement in the claims that "a first HARQ bit block is used for generating the second bit sub-block" comprises a meaning that when the first bit numerical value is greater than the second bit numerical value, the second bit sub-block is generated by the first HARQ bit block through compression; when the first bit numerical value is less than the second bit numerical value, the second bit sub-block is generated by the first HARQ bit block through padding; when the first bit numerical value is equal to the second bit numerical value, the second bit sub-block is the first HARQ bit block.

In one embodiment, the X1 candidate numerical values are pre-defined.

In one embodiment, the X1 candidate numerical values are signaling configured.

In one embodiment, the X1 candidate numerical values are configured by one or more fields in the first information block.

In one embodiment, any of the X1 candidate numerical values is greater than 0.

In one embodiment, there is a candidate numerical value among the X1 candidate numerical values being equal to 0.

In one embodiment, any two of the X1 candidate numerical values are unequal.

In one embodiment, the X1 candidate numerical values are distributed at equal intervals.

In one embodiment, the X1 candidate numerical values are distributed at unequal intervals.

In one embodiment, there is an equal interval between any two adjacent candidate numerical values of any sizes among the X1 candidate numerical values.

In one embodiment, the X1 candidate numerical values are sequentially arranged in an ascending/descending order, among which any two adjacent candidate numerical values are equal to a target interval value, the target interval value being pre-defined or configured by signaling.

In one embodiment, the statement in the claims that "the first bit numerical value is used to determine the second bit numerical value out of the X1 candidate numerical values" comprises the meaning that the first bit numerical value is used by the first node in the present application to determine the second bit numerical value out of the X1 candidate numerical values.

In one embodiment, the statement in the claims that "the first bit numerical value is used to determine the second bit numerical value out of the X1 candidate numerical values" comprises the meaning that the first bit numerical value is used to calculate the second bit numerical value from the X1 candidate numerical values.

In one embodiment, the statement in the claims that "the first bit numerical value is used to determine the second bit numerical value out of the X1 candidate numerical values" comprises the meaning that the second bit numerical value is a candidate numerical value most approximate to the first bit numerical value among the X1 candidate numerical values; when there are multiple candidate numerical values among the X1 candidate numerical values that have equal intervals to the second bit numerical value, the second bit numerical value is a candidate numerical value greater than the first bit numerical value among the multiple candidate numerical values.

In one embodiment, the statement in the claims that "the first bit numerical value is used to determine the second bit numerical value out of the X1 candidate numerical values" comprises the meaning that the second bit numerical value is a candidate numerical value most approximate to the first bit numerical value among the X1 candidate numerical values; when there are multiple candidate numerical values among the X1 candidate numerical values that have equal intervals to the second bit numerical value, the second bit numerical value is a candidate numerical value less than the first bit numerical value among the multiple candidate numerical values.

In one embodiment, the statement in the claims that "the first bit numerical value is used to determine the second bit numerical value out of the X1 candidate numerical values" comprises the meaning that the second bit numerical value is a candidate numerical value between which and the first bit numerical value the difference has a smallest absolute value among the X1 candidate numerical values; when there are multiple candidate numerical values among the X1 candidate numerical values between which and the second bit numerical value the differences have equal absolute values, the second bit numerical value is a candidate numerical value greater than the first bit numerical value among the multiple candidate numerical values.

In one embodiment, the statement in the claims that "the first bit numerical value is used to determine the second bit numerical value out of the X1 candidate numerical values" comprises the meaning that the second bit numerical value is a candidate numerical value between which and the first bit numerical value the difference has a smallest absolute value among the X1 candidate numerical values; when there are multiple candidate numerical values among the X1 candidate numerical values between which and the second bit numerical value the differences have equal absolute values, the second bit numerical value is a candidate numerical value less than the first bit numerical value among the multiple candidate numerical values.

In one embodiment, the statement in the claims that "the first bit numerical value is used to determine the second bit numerical value out of the X1 candidate numerical values" comprises the meaning that the second bit numerical value is a candidate numerical value most approximate to and no greater than the first bit numerical value among the X1 candidate numerical values.

In one embodiment, the statement in the claims that "the first bit numerical value is used to determine the second bit numerical value out of the X1 candidate numerical values" comprises the meaning that the second bit numerical value is a candidate numerical value most approximate to and no less than the first bit numerical value among the X1 candidate numerical values.

In one embodiment, the statement in the claims that "the first bit numerical value is used to determine the second bit numerical value out of the X1 candidate numerical values" comprises the meaning that the first bit numerical value is rounded up/down to determine the second bit numerical value from the X1 candidate numerical values.

Embodiment 9

Figure 9:
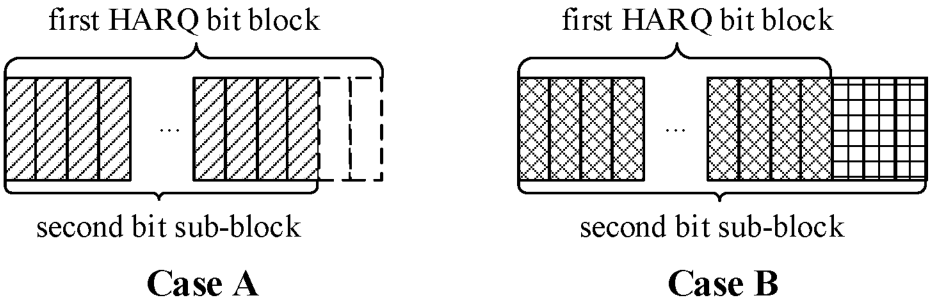
FIG. 9 illustrates a schematic diagram of a relationship between a first HARQ bit block and a second bit sub-block according to one embodiment of the present application.

Embodiment 9 illustrates a schematic diagram of a relationship between a first HARQ bit block and a second bit sub-block according to one embodiment of the present application, as shown in FIG. 9. In FIG. 9, in case A, each rectangle represents a bit in a first HARQ bit block, and each slash-filled rectangle represents a bit in a second bit sub-block; in case B, each cross-filled rectangle represents a bit in the first HARQ bit block, and each rectangle represents a bit in the second bit sub-block, and each reticle-filled rectangle represents a bit in the second bit block other than the first HARQ bit block.

In Embodiment 9, when the first bit numerical value in the present application is greater than the second bit numerical value in the present application, the second bit sub-block in the present application is generated by the first HARQ bit block in the present application through compression; when the first bit numerical value is smaller than the second bit numerical value, the second bit sub-block is generated by the first HARQ bit block through extension.

In one embodiment, the compression includes at least one of bundling, dropping, shortening or coding.

In one embodiment, the statement in the claims that "the second bit sub-block is generated by the first HARQ bit block through compression" comprises a meaning that the second bit sub-block is generated after partial bits in the first HARQ bit block are dropped.

In one embodiment, the statement in the claims that "the second bit sub-block is generated by the first HARQ bit block through compression" comprises a meaning that there are two or more bits in the first HARQ bit block being bundled to generate the second bit sub-block. In one subsidiary embodiment of the above embodiment, the bundling is Logical XOR. In one subsidiary embodiment of the above embodiment, the bundling is Logical AND.

In one embodiment, the statement in the claims that "the second bit sub-block is generated by the first HARQ bit block through compression" comprises a meaning that the second bit sub-block is generated after scaling down the first HARQ bit block by a size of corresponding HARQ-ACK codebook.

In one embodiment, the statement in the claims that "the second bit sub-block is generated by the first HARQ bit block through compression" comprises a meaning that the first HARQ bit block goes through compressed coding to generate the second bit sub-block. In one subsidiary embodiment of the above embodiment, the compressed coding uses FFT. In one subsidiary embodiment of the above embodiment, the compressed coding uses wavelet transform. In one subsidiary embodiment of the above embodiment, the compressed coding uses frequency-domain compression or time-domain compression.

In one embodiment, the extension includes at least one of bit padding, repetition or extended coding.

In one embodiment, the statement in the claims that "the second bit sub-block is generated by the first HARQ bit block through extension" comprises a meaning that the second bit sub-block is generated after adding at least one padding bit to the first HARQ bit block. In one subsidiary embodiment of the above embodiment, a bit value of each said padding bit is equal to "0". In one subsidiary embodiment of the above embodiment, a bit value of each said padding bit is equal to "1".

In one embodiment, the statement in the claims that "the second bit sub-block is generated by the first HARQ bit block through extension" comprises a meaning that the second bit sub-block is generated after all or partial bits comprised in the first HARQ bit block are repeated. In one subsidiary embodiment of the above embodiment, at least one Least Significant Bit (LSB) in the first HARQ bit block is repeated. In one subsidiary embodiment of the above embodiment, at least one Most Significant Bit (MSB) in the first HARQ bit block is repeated. In one subsidiary embodiment of the above embodiment, a positive integral multiple of a number of bits repeated in the first HARQ bit block is equal to a difference between the second bit numerical value and the first bit numerical value.

In one embodiment, the statement in the claims that "the second bit sub-block is generated by the first HARQ bit block through extension" comprises a meaning that the second bit sub-block is generated after extended coding of the first HARQ bit block. In one subsidiary embodiment of the above embodiment, the extended coding uses FFT. In one subsidiary embodiment of the above embodiment, the extended coding uses wavelet transform. In one subsidiary embodiment of the above embodiment, the extended coding uses frequency-domain extension or time-domain extension.

Embodiment 10

Figure 10:
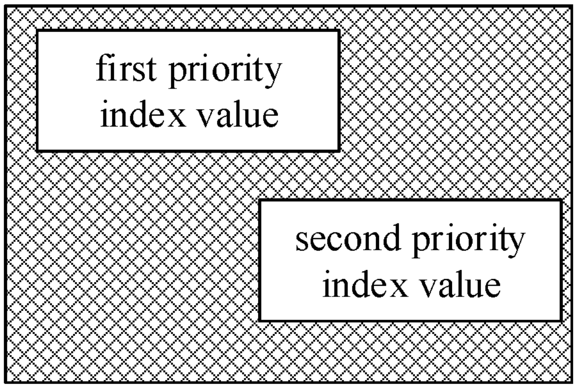
FIG. 10 illustrates a schematic diagram of a first-priority index value and a second-priority index value according to one embodiment of the present application.

Embodiment 10 illustrates a schematic diagram of a first-priority index value and a second-priority index value according to one embodiment of the present application, as shown in FIG. 10. In FIG. 10, the rectangle filled with crosses represents a target resource, two blank rectangles respectively represent resources mapped in the target resource by a first bit sub-block and a second bit sub-block, the first bit sub-block and the second bit sub-block being respectively associated with a first-priority index value and a second-priority index value.

In Embodiment 10, a value of a priority index associated with the first bit sub-block in the present application is equal to a first-priority index value, the first-priority index value being a non-negative integer; a value of a priority index associated with the second bit sub-block in the present application is equal to a second-priority index value, the second-priority index value being a non-negative integer; the first-priority index value and the second-priority index value are unequal; a value of a priority index associated with the target resource in the present application is equal to a larger one of the first-priority index value and the second-priority index value.

In one embodiment, the first-priority index value is equal to either 0 or 1.

In one embodiment, the second-priority index value is equal to either 0 or 1.

In one embodiment, the first-priority index value is equal to 1, and the second-priority index value is equal to 0.

In one embodiment, the first-priority index value is greater than the second-priority index value.

In one embodiment, the first-priority index value is less than the second-priority index value.

In one embodiment, a value of a priority index associated with the first bit sub-block is a value of a priority index of a Physical Downlink Shared Channel (PDSCH) corresponding to at least one bit comprised in the first bit sub-block.

In one embodiment, a value of a priority index associated with the first bit sub-block is a value of a Priority Indicator carried by a DCI Format associated with at least one bit comprised in the first bit sub-block.

In one embodiment, at least one bit comprised in the first bit sub-block is used to determine whether a target PDSCH is correctly decoded, where a value of a priority index associated with the first bit sub-block is a value of a priority index of the target PDSCH.

In one embodiment, at least one bit comprised in the first bit sub-block is used to determine whether a target PDSCH is correctly decoded, where a value of a priority index associated with the first bit sub-block is a value of a Priority Indicator carried by a DCI Format scheduling the target PDSCH.

In one embodiment, a value of a priority index associated with the first bit sub-block is configured by a signaling.

In one embodiment, a value of a priority index associated with the first bit sub-block is a default or pre-defined value of priority index.

In one embodiment, a value of a priority index associated with the first bit sub-block is a value of a priority index corresponding to a HARQ Codebook to which at least one bit comprised in the first bit sub-block belongs to.

In one embodiment, a value of a priority index associated with the first bit sub-block is a value of a priority index corresponding to an ID of a HARQ Codebook to which at least one bit comprised in the first bit sub-block belongs to.

In one embodiment, a value of a priority index associated with the second bit sub-block is a value of a priority index of a PDSCH corresponding to at least one bit comprised in the second bit sub-block.

In one embodiment, a value of a priority index associated with the second bit sub-block is a value of a Priority Indicator carried by a DCI Format associated with at least one bit comprised in the second bit sub-block.

In one embodiment, at least one bit comprised in the second bit sub-block is used to determine whether a characteristic PDSCH is correctly decoded, where a value of a priority index associated with the second bit sub-block is a value of a priority index of the characteristic PDSCH.

In one embodiment, at least one bit comprised in the second bit sub-block is used to determine whether a characteristic PDSCH is correctly decoded, where a value of a priority index associated with the second bit sub-block is a value of a Priority Indicator carried by a DCI Format scheduling the characteristic PDSCH.

In one embodiment, a value of a priority index associated with the second bit sub-block is configured by a signaling.

In one embodiment, a value of a priority index associated with the second bit sub-block is a default or pre-defined value of priority index.

In one embodiment, a value of a priority index associated with the second bit sub-block is a value of a priority index corresponding to a HARQ Codebook to which at least one bit comprised in the second bit sub-block belongs to.

In one embodiment, a value of a priority index associated with the second bit sub-block is a value of a priority index corresponding to an ID of a HARQ Codebook to which at least one bit comprised in the second bit sub-block belongs to.

In one embodiment, a value of a priority index associated with the target resource is a value of a priority index corresponding to a signaling configuring the target resource.

In one embodiment, a value of a priority index associated with the target resource is a value of a priority index associated with a HARQ-ACK codebook for which the target resource is used.

In one embodiment, a value of a priority index associated with the target resource is a value of a priority index of a PUCCH associated with a HARQ-ACK codebook for which the target resource is used.

In one embodiment, a value of a priority index associated with the target resource is a value of a priority index associated with a HARQ-ACK codebook for which a signaling configuring the target resource is applied.

In one embodiment, a value of a priority index associated with the target resource is a value of a priority index of a PUCCH associated with a HARQ-ACK codebook for which a signaling configuring the target resource is applied.

In one embodiment, a "PUCCH-ConfigurationList" IE comprises a first PUCCH configuration and a second PUCCH configuration, where the first PUCCH configuration is applied in a first HARQ-ACK codebook and the second PUCCH configuration is applied in a second HARQ-ACK codebook, a value of a priority index associated with the target resource being a value of a priority index of a PUCCH associated with the second HARQ-ACK codebook.

In one embodiment, a value of a priority index associated with the target resource is a value of a priority index of a PUCCH associated with a HARQ-ACK codebook applied by a "PUCCH-Config" IE configuring the target resource.

Embodiment 11

Figure 11:
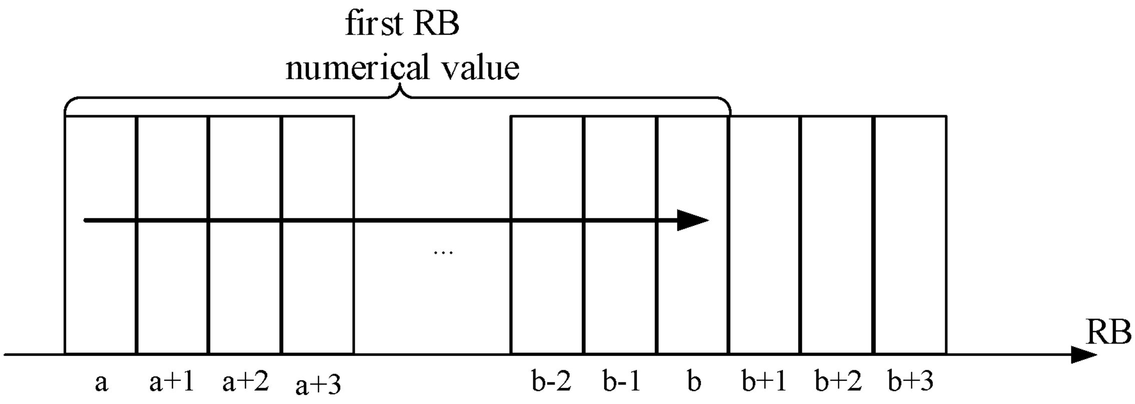
FIG. 11 illustrates a schematic diagram of a first RB numerical value according to one embodiment of the present application.

Embodiment 11 illustrates a schematic diagram of a first RB numerical value according to one embodiment of the present application, as shown in FIG. 11. In FIG. 11, the horizontal axis represents indexes of RBs, each rectangle represents an RB, the solid line with arrowhead represents mapping of a first bit sub-block and a second bit sub-block according to a first coding rate, and a first RB numerical value is a smallest number of RBs required for the mapping of the first bit sub-block and the second bit sub-block according to the first coding rate.

In Embodiment 11, the number of the bit(s) comprised in the first bit sub-block in the present application and the number of the bit(s) associated with the second bit sub-block in the present application are used together to determine a first sum value; a first coding rate is equal to a coding rate corresponding to the first bit sub-block, a first modulation order is equal to a modulation order of the target PUCCH in the present application, a first resource numerical value is equal to a number of resource elements comprised by the target resource of the present application in one RB used for control information bits; a product of the first RB numerical value, the first coding rate, the first modulation order and the first resource numerical value is no smaller than the first sum value, while a product of the first RB numerical value subtracted by 1, the first coding rate, the first modulation order and the first resource numerical value is smaller than the first sum value.

In one embodiment, the statement in the claims that "the number of the bit(s) comprised in the first bit sub-block and the number of the bit(s) associated with the second bit sub-block are used together to determine a first sum value" means that: the number of the bit(s) comprised in the first bit sub-block and the number of the bit(s) associated with the second bit sub-block are used together by the first node in the present application to determine the first sum value.

In one embodiment, the statement in the claims that "the number of the bit(s) comprised in the first bit sub-block and the number of the bit(s) associated with the second bit sub-block are used together to determine a first sum value" means that: the number of the bit(s) comprised in the first bit sub-block and the number of the bit(s) associated with the second bit sub-block are used together to calculate the first sum value.

In one embodiment, the statement in the claims that "the number of the bit(s) comprised in the first bit sub-block and the number of the bit(s) associated with the second bit sub-block are used together to determine a first sum value" means that: the first sum value is equal to a sum of the number of the bit(s) comprised in the first bit sub-block and the number of the bit(s) associated with the second bit sub-block.

In one embodiment, the statement in the claims that "the number of the bit(s) comprised in the first bit sub-block and the number of the bit(s) associated with the second bit sub-block are used together to determine a first sum value" means that: the first sum value is equal to a sum of the number of the bit(s) comprised in the first bit sub-block, a number of CRC bit(s) attached to the first bit sub-block (if there is at least one CRC bit being attached to the first bit sub-block), the number of the bit(s) associated with the second bit sub-block and a number of CRC bit(s) attached to the second bit sub-block (if there is at least one CRC bit being attached to the second bit sub-block).

In one embodiment, the first sum value is a positive integer.

In one embodiment, the first modulation order is a positive integer.

In one embodiment, the first modulation order is a non-negative integral power of 2.

In one embodiment, a modulation order of the target PUCCH is equal to 1.

In one embodiment, a modulation order of the target PUCCH is equal to 2.

In one embodiment, a modulation order of the target PUCCH is equal to the modulation order of one of modulation schemes BPSK, QPSK, 16QAM, 64QAM, 256QAM or 1024QAM.

In one embodiment, the first resource numerical value is a positive integer.

In one embodiment, a number of resource elements comprised by the target resource in an RB used for control information bits is equal to a number of resource elements used for control information bits comprised in the target resource that belong to an RB in frequency domain.

In one embodiment, a number of resource elements comprised by the target resource in an RB used for control information bits is equal to a number of REs used for control information bits comprised in the target resource that belong to an RB in frequency domain.

In one embodiment, a number of resource elements comprised by the target resource in an RB used for control information bits is equal to a product of $$N_{sc,ctrl}^{RB} \text{ and } N_{symb-UCI}^{PUCCH},$$

where $$N_{sc,ctrl}^{RB}$$

represents a number of subcarriers used for control information bits within an RB comprised in the target resource in frequency domain, and $$N_{symb-UCI}^{PUCCH}$$

represents a number of time-domain symbols other than time-domain symbols occupied by reference signals, if any, comprised by the target resource set in time domain.

In one embodiment, a number of resource elements comprised by the target resource in an RB used for control information bits is equal to a product of $$N_{sc,ctrl}^{RB} \text{ and } N_{symb-UCI}^{PUCCH},$$

where $$N_{sc,ctrl}^{RB}$$

represents a positive integer determined by a format of the target PUCCH, and $$N_{symb-UCI}^{PUCCH}$$

represents a number of time-domain symbols other than time-domain symbols occupied by reference signals, if any, comprised by the target resource set in time domain.

In one embodiment, a number of resource elements comprised by the target resource in an RB used for control information bits is equal to a product of $$N_{sc,ctrl}^{RB} \text{ and } N_{symb-UCI}^{PUCCH},$$

where $$N_{sc,ctrl}^{RB}$$

represents a number of subcarriers other than subcarriers occupied by reference signals, if any, comprised within an RB comprised in the target resource in frequency domain, and $$N_{symb-UCI}^{PUCCH}$$

represents a number of time-domain symbols other than time-domain symbols occupied by reference signals, if any, comprised by the target resource set in time domain.

In one embodiment, a number of resource elements comprised by the target resource in an RB used for control information bits is equal to a product of $$N_{sc,ctrl}^{RB} \text{ and } N_{symb-UCI}^{PUCCH},$$

where a first subcarrier number is equal to a number of subcarriers other than subcarriers occupied by reference signals, if any, comprised within an RB comprised in the target resource in frequency domain;

$$N_{sc,ctrl}^{RB}$$

represents a quotient between the first subcarrier number and a scaling factor of the target PUCCH, and $$N_{symb-UCI}^{PUCCH}$$

represents a number of time-domain symbols other than time-domain symbols occupied by reference signals, if any, comprised by the target resource set in time domain.

In one embodiment, a number of resource elements comprised by the target resource in an RB used for control information bits is equal to a product of $$N_{sc,ctrl}^{RB} \text{ and } N_{symb-UCI}^{PUCCH},$$

where a first subcarrier number is equal to a number of subcarriers other than subcarriers occupied by reference signals, if any, comprised within an RB comprised in the target resource in frequency domain;

$$N_{sc,ctrl}^{RB}$$

represents a quotient between the first subcarrier number and a scaling factor of the target PUCCH (when the format of the target PUCCH does not include orthogonal cover code (OCC), the scaling factor of the target PUCCH is equal to 1), and $$N_{symb-UCI}^{PUCCH}$$

represents a number of time-domain symbols other than time-domain symbols occupied by reference signals, if any, comprised by the target resource set in time domain.

Embodiment 12

Figure 12:
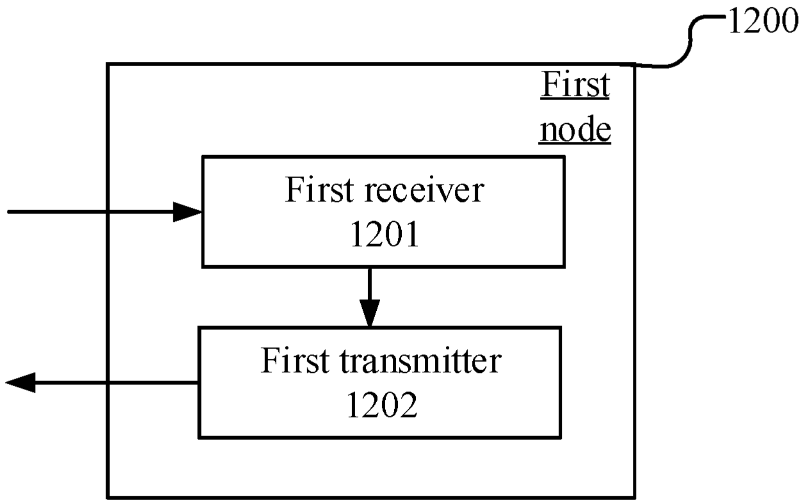
FIG. 12 illustrates a structure block diagram of a processing device in a first node according to one embodiment of the present application.

Embodiment 12 illustrates a structure block diagram of a processing device in a first node in one embodiment, as shown in FIG. 12. In FIG. 12, a processing device 1200 in the first node is comprised of a first receiver 1201 and a first transmitter 1202. The first receiver 1201 comprises the transmitter/receiver 456 (comprising the antenna 460), the receiving processor 452 and the controller/processor 490 in FIG. 4 of the present application; the first transmitter 1202 comprises the transmitter/receiver 456 (comprising the antenna 460) and the transmitting processor 455 in FIG. 4 of the present application.

In Embodiment 12, the first receiver 1201 receives a first information block, the first information block being used to determine a first factor; and the first transmitter 1202 transmits a target PUCCH, the target PUCCH at least carrying a first bit sub-block, the first bit sub-block comprising at least one bit; herein, the target PUCCH carries a non-negative integer number of bit(s) belonging to a second bit sub-block, the second bit sub-block comprising at least one bit, the first bit sub-block and the second bit sub-block being different; a sum of a number of bit(s) comprised in the first bit sub-block and a number of bit(s) associated with the second bit sub-block is greater than 2, where the number of the bit(s) comprised in the first bit sub-block and the number of the bit(s) associated with the second bit sub-block are used together to determine a first RB numerical value; a resource occupied by the target PUCCH belongs to a target resource, with a number of RBs comprised in the target resource in frequency domain being equal to a second RB numerical value; a relative magnitude of the first RB numerical value and the second RB numerical value is used together with the first factor to determine a number of bit(s) carried by the target PUCCH that belongs (belong) to the second bit sub-block.

In one embodiment, a coding rate corresponding to the first bit sub-block and the number of the bit(s) comprised in the first bit sub-block are used together to determine a third RB numerical value; when the first RB numerical value is no greater than the second RB numerical value, the target PUCCH carries all bit(s) belonging to the second bit sub-block; when the first RB numerical value is greater than the second RB numerical value, a difference between the second RB numerical value and the third RB numerical value is used together with the first factor to determine the number of the bit(s) carried by the target PUCCH that belongs (belong) to the second bit sub-block.

In one embodiment, the first receiver 1201 receives a first signaling; herein, the first signaling is used to determine the target resource from a target resource set, the target resource set comprising at least one PUCCH resource, at least the first two of the number of the bit(s) comprised in the first bit sub-block, the number of the bit(s) associated with the second bit sub-block and the first factor being used to determine the target resource set.

In one embodiment, a first HARQ bit block is used for generating the second bit sub-block, the first HARQ bit block comprising at least one HARQ-ACK bit, a first bit numerical value is equal to a number of bit(s) comprised in the first HARQ bit block; a second bit numerical value is equal to a number of bit(s) comprised in the second bit sub-block, and the second bit numerical value is equal to one of X1 candidate numerical values, among the X1 candidate numerical values any candidate numerical value is a non-negative integer, where X1 is a positive integer greater than 1; the first bit numerical value is used to determine the second bit numerical value out of the X1 candidate numerical values.

In one embodiment, when the first bit numerical value is greater than the second bit numerical value, the second bit sub-block is generated by the first HARQ bit block through compression; when the first bit numerical value is smaller than the second bit numerical value, the second bit sub-block is generated by the first HARQ bit block through extension.

In one embodiment, a value of a priority index associated with the first bit sub-block is equal to a first-priority index value, the first-priority index value being a non-negative integer; a value of a priority index associated with the second bit sub-block is equal to a second-priority index value, the second-priority index value being a non-negative integer; the first-priority index value and the second-priority index value are unequal; a value of a priority index associated with the target resource is equal to a larger one of the first-priority index value and the second-priority index value.

In one embodiment, the number of the bit(s) comprised in the first bit sub-block and the number of the bit(s) associated with the second bit sub-block are used together to determine a first sum value; a first coding rate is equal to a coding rate corresponding to the first bit sub-block, a first modulation order is equal to a modulation order of the target PUCCH, a first resource numerical value is equal to a number of resource elements comprised by the target resource in one RB used for control information bits; a product of the first RB numerical value, the first coding rate, the first modulation order and the first resource numerical value is no smaller than the first sum value, while a product of the first RB numerical value subtracted by 1, the first coding rate, the first modulation order and the first resource numerical value is smaller than the first sum value.

Embodiment 13

Figure 13:
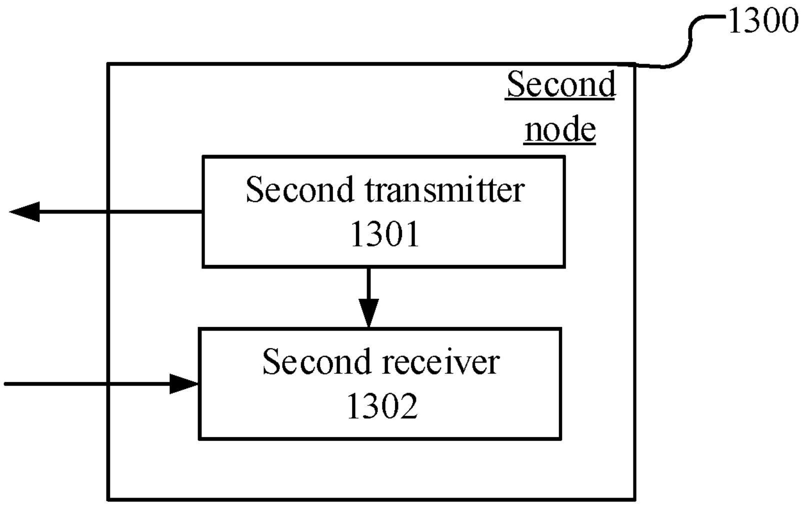
FIG. 13 illustrates a structure block diagram a processing device in a second node according to one embodiment of the present application.

Embodiment 13 illustrates a structure block diagram of a processing device in a second node in one embodiment, as shown in FIG. 13. In FIG. 13, a processing device 1300 in the second node is comprised of a second transmitter 1301 and a second receiver 1302. The second transmitter 1301 comprises the transmitter/receiver 416 (comprising the antenna 460), the transmitting processor 415 and the controller/processor 440 in FIG. 4 of the present application; the second receiver 1302 comprises the transmitter/receiver 416

(comprising the antenna 460), the receiving processor 412 and the controller/processor 440 in FIG. 4 of the present application.

In Embodiment 13, the second transmitter 1301 transmits a first information block, the first information block being used to indicate a first factor; and the second receiver 1302 receives a target PUCCH, the target PUCCH at least carrying a first bit sub-block, the first bit sub-block comprising at least one bit; herein, the target PUCCH carries a non-negative integer number of bit(s) belonging to a second bit sub-block, the second bit sub-block comprising at least one bit, the first bit sub-block and the second bit sub-block being different; a sum of a number of bit(s) comprised in the first bit sub-block and a number of bit(s) associated with the second bit sub-block is greater than 2, where the number of the bit(s) comprised in the first bit sub-block and the number of the bit(s) associated with the second bit sub-block are used together to determine a first RB numerical value; a resource occupied by the target PUCCH belongs to a target resource, with a number of RBs comprised in the target resource in frequency domain being equal to a second RB numerical value; a relative magnitude of the first RB numerical value and the second RB numerical value is used together with the first factor to determine a number of bit(s) carried by the target PUCCH that belongs (belong) to the second bit sub-block.

In one embodiment, a coding rate corresponding to the first bit sub-block and the number of the bit(s) comprised in the first bit sub-block are used together to determine a third RB numerical value; when the first RB numerical value is no greater than the second RB numerical value, the target PUCCH carries all bit(s) belonging to the second bit sub-block; when the first RB numerical value is greater than the second RB numerical value, a difference between the second RB numerical value and the third RB numerical value is used together with the first factor to determine the number of the bit(s) carried by the target PUCCH that belongs (belong) to the second bit sub-block.

In one embodiment, the second transmitter 1301 transmits a first signaling; herein, the first signaling is used to indicate the target resource from a target resource set, the target resource set comprising at least one PUCCH resource, at least the first two of the number of the bit(s) comprised in the first bit sub-block, the number of the bit(s) associated with the second bit sub-block and the first factor being used to determine the target resource set.

In one embodiment, a first HARQ bit block is used for generating the second bit sub-block, the first HARQ bit block comprising at least one HARQ-ACK bit, a first bit numerical value is equal to a number of bit(s) comprised in the first HARQ bit block; a second bit numerical value is equal to a number of bit(s) comprised in the second bit sub-block, and the second bit numerical value is equal to one of X1 candidate numerical values, among the X1 candidate numerical values any candidate numerical value is a non-negative integer, where X1 is a positive integer greater than 1; the first bit numerical value is used to determine the second bit numerical value out of the X1 candidate numerical values.

In one embodiment, when the first bit numerical value is greater than the second bit numerical value, the second bit sub-block is generated by the first HARQ bit block through compression; when the first bit numerical value is smaller than the second bit numerical value, the second bit sub-block is generated by the first HARQ bit block through extension.

In one embodiment, a value of a priority index associated with the first bit sub-block is equal to a first-priority index value, the first-priority index value being a non-negative integer; a value of a priority index associated with the second bit sub-block is equal to a second-priority index value, the second-priority index value being a non-negative integer; the first-priority index value and the second-priority index value are unequal; a value of a priority index associated with the target resource is equal to a larger one of the first-priority index value and the second-priority index value.

In one embodiment, the number of the bit(s) comprised in the first bit sub-block and the number of the bit(s) associated with the second bit sub-block are used together to determine a first sum value; a first coding rate is equal to a coding rate corresponding to the first bit sub-block, a first modulation order is equal to a modulation order of the target PUCCH, a first resource numerical value is equal to a number of resource elements comprised in one RB used for control information bits; a product of the first RB numerical value, the first coding rate, the first modulation order and the first resource numerical value is no smaller than the first sum value, while a product of the first RB numerical value subtracted by 1, the first coding rate, the first modulation order and the first resource numerical value is smaller than the first sum value.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node or the second node, or UE or terminal includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, testing device, testing equipment, test instrument, etc. The base station in the present application includes but is not limited to macro-cellular base stations, micro-cellular base stations, home base stations, relay base station, eNB, gNB, Transmitter Receiver Point (TRP), relay satellite, satellite base station, airborne base station, test apparatus, test equipment or test instrument, and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:

a first receiver, which receives a first information block and a first signaling, the first information block being used to determine a first factor, the first factor being equal to a configured maximum coding rate; and a first transmitter, which transmits a target Physical Uplink Control Channel (PUCCH), the target PUCCH at least carrying a first bit sub-block, the first bit sub-block comprising at least one bit;

wherein the target PUCCH carries zero, one or more bits belonging to a second bit sub-block, the second bit sub-block comprising at least one bit, the first bit sub-block and the second bit sub-block being different, the first bit sub-block is with higher priority than the second bit sub-block; a sum of a number of bits comprised in the first bit sub-block and a number of bits associated with the second bit sub-block is greater than 2, where the number of the bits comprised in the first bit sub-block and the number of the bits associated with the second bit sub-block are used together to determine a first Resource Block (RB) numerical value; a resource occupied by the target PUCCH belongs to a target resource, with a number of RBs comprised in the target resource in frequency domain being equal to a second RB numerical value, the target resource is a PUCCH resource; a relative magnitude of the first RB numerical value and the second RB numerical value is used together with the first factor to determine a number of bits belonging to the second bit sub-block and carried by the target PUCCH; the first signaling is used to determine the target resource from a target resource set, the target resource set comprising at least one PUCCH resource, a sum of the number of the bits comprised in the first bit sub-block and the number of the bits associated with the second bit sub-block being used to determine the target resource set; the target resource set is one of K1 resource sets, the K1 resource sets being signaling configured or pre-defined, K1 being a positive integer greater than 1; the K1 resource sets respectively correspond to K1 value ranges, the sum of the number of the bits comprised in the first bit sub-block and the number of the bits associated with the second bit sub-block belongs to a target value range, the target value range being one of the K1 value ranges, the target resource set being a resource set corresponding to the target value range among the K1 resource sets.

2. The first node according to claim 1, wherein a coding rate corresponding to the first bit sub-block and the number of the bits comprised in the first bit sub-block are used together to determine a third RB numerical value; when the first RB numerical value is no greater than the second RB numerical value, the target PUCCH carries all bits belonging to the second bit sub-block; when the first RB numerical value is greater than the second RB numerical value, a difference between the second RB numerical value and the third RB numerical value is used together with the first factor to determine the number of the bits belonging to the second bit sub-block and carried by the target PUCCH.

3. The first node according to claim 1, wherein a value of a priority index associated with the first bit sub-block is equal to a first priority index value, the first priority index value being a non-negative integer; a value of a priority index associated with the second bit sub-block is equal to a second priority index value, the second priority index value being a non-negative integer; the first priority index value and the second priority index value are unequal; a value of a priority index associated with the target resource is equal to a larger one of the first priority index value and the second priority index value.

4. The first node according to claim 1, wherein the number of the bits comprised in the first bit sub-block and the number of the bits associated with the second bit sub-block are used together to determine a first sum value; a first coding rate is equal to a coding rate corresponding to the first bit sub-block, a first modulation order is equal to a modulation order of the target PUCCH, a first resource numerical value is equal to a number of resource elements comprised in one RB used for control information bits; a product of the first RB numerical value, the first coding rate, the first modulation order and the first resource numerical value is no smaller than the first sum value, while a product of the first RB numerical value subtracted by 1, the first coding rate, the first modulation order and the first resource numerical value is smaller than the first sum value.

5. The first node according to claim 1, wherein the first bit sub-block only comprises information bits, any bit comprised in the first bit sub-block is a HARQ-ACK bit; any bit comprised in the second bit sub-block is a coded bit obtained by coding a HARQ-ACK bit, a bit associated with the second bit sub-block is a HARQ-ACK bit used for generating the second bit sub-block.

6. A second node for wireless communications, comprising:

a second transmitter, which transmits a first information block and a first signaling, the first information block being used to indicate a first factor, the first factor being equal to a configured maximum coding rate; and a second receiver, which receives a target Physical Uplink Control Channel (PUCCH), the target PUCCH at least carrying a first bit sub-block, the first bit sub-block comprising at least one bit;

wherein the target PUCCH carries zero, one or more bits belonging to a second bit sub-block, the second bit sub-block comprising at least one bit, the first bit sub-block and the second bit sub-block being different, the first bit sub-block is with higher priority than the second bit sub-block; a sum of a number of bits comprised in the first bit sub-block and a number of bits associated with the second bit sub-block is greater than 2, where the number of the bits comprised in the first bit sub-block and the number of the bits associated with the second bit sub-block are used together to determine a first Resource Block (RB) numerical value; a resource occupied by the target PUCCH belongs to a target resource, with a number of RBs comprised in the target resource in frequency domain being equal to a second RB numerical value, the target resource is a PUCCH resource; a relative magnitude of the first RB numerical value and the second RB numerical value is used together with the first factor to determine a number of bits belonging to the second bit sub-block and carried by the target PUCCH; the first signaling is used to determine the target resource from a target resource set, the target resource set comprising at least one PUCCH resource, a sum of the number of the bits comprised in the first bit sub-block and the number of the bits associated with the second bit sub-block being used to determine the target resource set; the target resource set is one of K1 resource sets, the K1 resource sets being signaling configured or pre-defined, K1 being a positive integer greater than 1; the K1 resource sets respectively correspond to K1 value ranges, the sum of the number of the bits comprised in the first bit sub-block and the number of the bits associated with the second bit sub-block belongs to a target value range, the target value range being one of the K1 value ranges, the target resource set being a resource set corresponding to the target value range among the K1 resource sets.

7. The second node according to claim 6, wherein a coding rate corresponding to the first bit sub-block and the number of the bits comprised in the first bit sub-block are used together to determine a third RB numerical value; when the first RB numerical value is no greater than the second RB numerical value, the target PUCCH carries all bits belonging to the second bit sub-block; when the first RB numerical value is greater than the second RB numerical value, a difference between the second RB numerical value and the third RB numerical value is used together with the first factor to determine the number of the bits belonging to the second bit sub-block and carried by the target PUCCH.

8. The second node according to claim 6, wherein a value of a priority index associated with the first bit sub-block is equal to a first priority index value, the first priority index value being a non-negative integer; a value of a priority index associated with the second bit sub-block is equal to a second priority index value, the second priority index value being a non-negative integer; the first priority index value and the second priority index value are unequal; a value of a priority index associated with the target resource is equal to a larger one of the first priority index value and the second priority index value.

9. The second node according to claim 6, wherein the number of the bits comprised in the first bit sub-block and the number of the bits associated with the second bit sub-block are used together to determine a first sum value; a first coding rate is equal to a coding rate corresponding to the first bit sub-block, a first modulation order is equal to a modulation order of the target PUCCH, a first resource numerical value is equal to a number of resource elements comprised in one RB used for control information bits; a product of the first RB numerical value, the first coding rate, the first modulation order and the first resource numerical value is no smaller than the first sum value, while a product of the first RB numerical value subtracted by 1, the first coding rate, the first modulation order and the first resource numerical value is smaller than the first sum value.

10. The second node according to claim 6, wherein the first bit sub-block only comprises information bits, any bit comprised in the first bit sub-block is a HARQ-ACK bit; any bit comprised in the second bit sub-block is a coded bit obtained by coding a HARQ-ACK bit, a bit associated with the second bit sub-block is a HARQ-ACK bit used for generating the second bit sub-block.

11. A method in a first node for wireless communications, comprising:

receiving a first information block and a first signaling, the first information block being used to determine a first factor, the first factor being equal to a configured maximum coding rate; and transmitting a target Physical Uplink Control Channel (PUCCH), the target PUCCH at least carrying a first bit sub-block, the first bit sub-block comprising at least one bit;

wherein the target PUCCH carries zero, one or more bits belonging to a second bit sub-block, the second bit sub-block comprising at least one bit, the first bit sub-block and the second bit sub-block being different, the first bit sub-block is with higher priority than the second bit sub-block; a sum of a number of bits comprised in the first bit sub-block and a number of bits associated with the second bit sub-block is greater than 2, where the number of the bits comprised in the first bit sub-block and the number of the bits associated with the second bit sub-block are used together to determine a first Resource Block (RB) numerical value; a resource occupied by the target PUCCH belongs to a target resource, with a number of RBs comprised in the target resource in frequency domain being equal to a second RB numerical value, the target resource is a PUCCH resource; a relative magnitude of the first RB numerical value and the second RB numerical value is used together with the first factor to determine a number of bits belonging to the second bit sub-block and carried by the target PUCCH; the first signaling is used to determine the target resource from a target resource set, the target resource set comprising at least one PUCCH resource, a sum of the number of the bits comprised in the first bit sub-block and the number of the bits associated with the second bit sub-block being used to determine the target resource set; the target resource set is one of K1 resource sets, the K1 resource sets being signaling configured or pre-defined, K1 being a positive integer greater than 1; the K1 resource sets respectively correspond to K1 value ranges, the sum of the number of the bits comprised in the first bit sub-block and the number of the bits associated with the second bit sub-block belongs to a target value range, the target value range being one of the K1 value ranges, the target resource set being a resource set corresponding to the target value range among the K1 resource sets.

12. The method in the first node according to claim 11, wherein a coding rate corresponding to the first bit sub-block and the number of the bits comprised in the first bit sub-block are used together to determine a third RB numerical value; when the first RB numerical value is no greater than the second RB numerical value, the target PUCCH carries all bits belonging to the second bit sub-block; when the first RB numerical value is greater than the second RB numerical value, a difference between the second RB numerical value and the third RB numerical value is used together with the first factor to determine the number of the bits belonging to the second bit sub-block and carried by the target PUCCH.

13. The method in the first node according to claim 11, wherein a value of a priority index associated with the first bit sub-block is equal to a first priority index value, the first priority index value being a non-negative integer; a value of a priority index associated with the second bit sub-block is equal to a second priority index value, the second priority index value being a non-negative integer; the first priority index value and the second priority index value are unequal; a value of a priority index associated with the target resource is equal to a larger one of the first priority index value and the second priority index value.

14. The method in the first node according to claim 11, wherein the number of the bits comprised in the first bit sub-block and the number of the bits associated with the second bit sub-block are used together to determine a first sum value; a first coding rate is equal to a coding rate corresponding to the first bit sub-block, a first modulation order is equal to a modulation order of the target PUCCH, a first resource numerical value is equal to a number of resource elements comprised in one RB used for control information bits; a product of the first RB numerical value, the first coding rate, the first modulation order and the first resource numerical value is no smaller than the first sum value, while a product of the first RB numerical value subtracted by 1, the first coding rate, the first modulation order and the first resource numerical value is smaller than the first sum value.

15. The method in the first node according to claim 11, wherein the first bit sub-block only comprises information bits, any bit comprised in the first bit sub-block is a HARQ-ACK bit; any bit comprised in the second bit sub-block is a coded bit obtained by coding a HARQ-ACK bit, a bit associated with the second bit sub-block is a HARQ-ACK bit used for generating the second bit sub-block.

* * * * *